(12) United States Patent
Fukuoka

(10) Patent No.: US 9,036,066 B2
(45) Date of Patent: May 19, 2015

(54) SOLID-STATE IMAGE PICKUP DEVICE, METHOD OF CONTROLLING SOLID-STATE IMAGE PICKUP DEVICE, AND IMAGE PICKUP DEVICE

(71) Applicant: OLYMPUS CORPORATION, Tokyo (JP)

(72) Inventor: Naoto Fukuoka, Atsugi (JP)

(73) Assignee: OLYMPUS CORPORATION, Tokyo (JP)

( * ) Notice: Subject to any disclaimer, the term of this patent is extended or adjusted under 35 U.S.C. 154(b) by 22 days.

(21) Appl. No.: 14/036,862

(22) Filed: Sep. 25, 2013

(65) Prior Publication Data

US 2014/0139715 A1    May 22, 2014

(30) Foreign Application Priority Data

Nov. 20, 2012    (JP) .................................. 2012-254093

(51) Int. Cl.
| | |
|---|---|
| H04N 3/14 | (2006.01) |
| H04N 5/335 | (2011.01) |
| H04N 5/228 | (2006.01) |
| G03B 13/00 | (2006.01) |
| H04N 5/232 | (2006.01) |
| H04N 5/353 | (2011.01) |
| H04N 5/369 | (2011.01) |
| H04N 5/3745 | (2011.01) |

(52) U.S. Cl.
CPC ........... *H04N 5/3535* (2013.01); *H04N 5/3696* (2013.01); *H04N 5/37452* (2013.01)

(58) Field of Classification Search
USPC ................ 348/222.1, 229.1–230.1, 266–283, 348/294–324, 345–357, 362–368; 250/208.1; 396/63–88, 213–262
See application file for complete search history.

(56) References Cited

U.S. PATENT DOCUMENTS

| | | | | |
|---|---|---|---|---|
| 6,697,108 | B1 * | 2/2004 | Chen et al. ..................... | 348/241 |
| 6,829,008 | B1 * | 12/2004 | Kondo et al. ................. | 348/302 |
| 7,839,444 | B2 * | 11/2010 | Kuruma .................. | 348/333.01 |
| 8,111,310 | B2 * | 2/2012 | Kusaka ......................... | 348/294 |
| 8,218,962 | B2 * | 7/2012 | Fujii et al. ..................... | 396/100 |
| 8,730,347 | B2 * | 5/2014 | Hirose ........................ | 348/226.1 |
| 2005/0185086 | A1 * | 8/2005 | Onozawa ....................... | 348/349 |
| 2007/0126909 | A1 * | 6/2007 | Kuruma .................. | 348/333.01 |
| 2008/0291311 | A1 * | 11/2008 | Kusaka .......................... | 348/308 |

(Continued)

FOREIGN PATENT DOCUMENTS

JP    2011-171749 A    9/2011

*Primary Examiner* — Michael Osinski
(74) *Attorney, Agent, or Firm* — Westerman, Hattori, Daniels & Adrian, LLP

(57) ABSTRACT

A solid-state image pickup device includes a plurality of pixels arranged in a two-dimensional matrix, and outputs signals corresponding to the light quantity incident on each pixel. Each pixel includes: a first pixel that is equipped with a first photoelectric conversion means that converts incident light into an electrical signal to store it; and a second pixel that is equipped with a second photoelectric conversion means that converts incident light into an electrical signal to store it, and a light beam selecting means that selects a light beam that is incident on the second photoelectric conversion means. The solid-state image pickup device includes: a first scanning circuit; and a second scanning circuit. The solid-state image pickup device outputs the electrical signals stored in the first photoelectric conversion means as image signals, and outputs the electrical signals stored in the second photoelectric conversion means as focus signals.

8 Claims, 11 Drawing Sheets

(56) References Cited

U.S. PATENT DOCUMENTS

| | | | |
|---|---|---|---|
| 2009/0219423 A1* | 9/2009 | Suzuki | 348/302 |
| 2010/0026853 A1* | 2/2010 | Mokhnatyuk | 348/240.2 |
| 2010/0302433 A1* | 12/2010 | Egawa | 348/345 |
| 2011/0076001 A1* | 3/2011 | Iwasaki | 396/114 |
| 2011/0090393 A1* | 4/2011 | Kawarada | 348/345 |
| 2011/0102623 A1* | 5/2011 | Ebihara | 348/222.1 |
| 2011/0194007 A1* | 8/2011 | Kim et al. | 348/308 |
| 2012/0044406 A1* | 2/2012 | Shimoda et al. | 348/345 |
| 2013/0314586 A1* | 11/2013 | Shimamoto et al. | 348/348 |
| 2014/0211079 A1* | 7/2014 | Aoki | 348/353 |

* cited by examiner

FIG. 6
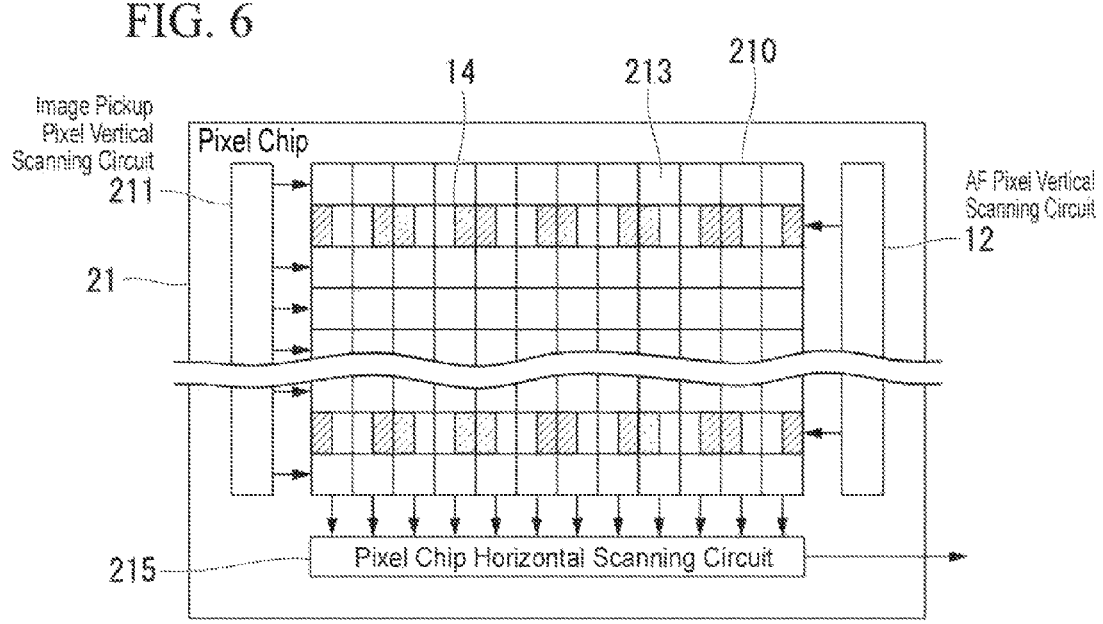
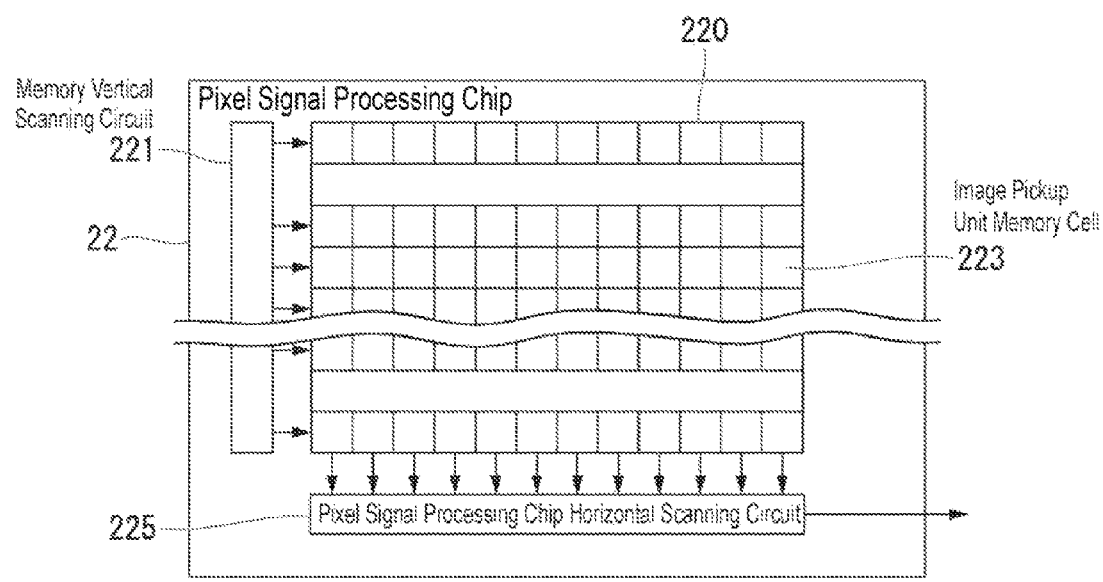

SOLID-STATE IMAGE PICKUP DEVICE, METHOD OF CONTROLLING SOLID-STATE IMAGE PICKUP DEVICE, AND IMAGE PICKUP DEVICE

BACKGROUND OF THE INVENTION

1. Field of the Invention

The present invention relates to a solid-state image pickup device, a method of controlling a solid-state image pickup device, and an image pickup device.

Priority is claimed on Japanese Patent Application No. 2012-254093, filed Nov. 20, 2012, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In recent years, complementary metal-oxide semiconductor (CMOS) solid-state image pickup devices (hereinafter, referred to as a "MOS-type solid-state image pickup devices) have gained attention and been put to practical use.

This MOS-type solid-state image pickup device can be driven by a single power source, unlike a charge-coupled device (CCD)-type solid-state image pickup device. Also, while a dedicated fabrication process is required for a CCD-type solid-state image pickup device, since it is possible to fabricate a MOS-type solid-state image pickup device using the same fabrication process as for other LSI circuits, compatibility with system-on-chip (SOC) fabrication is easy, thus enabling multi-functionality of a solid-state image pickup device.

Also, since a MOS-type solid-state image pickup device amplifies the signal charge in a pixel by providing an amplification circuit in each pixel, it has a constitution that is hardly influenced by noise from the signal transmission route. Moreover, selecting and extracting the signal charge of each pixel (selection system) is possible, and so in principal it is characterized by being able to freely control the signal storage time and readout sequence for every pixel.

Conventionally, a digital single-lens reflex camera is an image pickup device that is equipped with a MOS-type solid-state image pickup device (hereinafter also called a "solid-state image pickup device").

In a conventional digital single-lens reflex camera, subject information is obtained by causing the subject light (incident light) that has passed through the lens to be made incident on the solid-state image pickup device, and guiding the subject light to, for example, sensors for autofocus (AF) such as phase-detection AF sensors using a mirror.

However, so-called mirrorless cameras that are not provided with the aforementioned mirror are now gaining popularity. In a mirrorless camera, it is not possible to guide the subject light to the phase-detection AF sensors by a mirror in the manner of a conventional digital single-lens reflex camera. For this reason, in the AF system in a mirrorless camera, there is no choice but to adopt the so-called contrast-detection AF system that performs autofocus control based on pixel signals that are output from the solid-state image pickup device.

However, with regard to the autofocus control in the contrast-detection AF system, generally there is the problem of the AF operation being slow in comparison to the autofocus control of a system that uses a phase-detection AF sensor.

As art for solving this kind of problem, Japanese Unexamined Patent Application, First Publication No. 2011-171749 discloses an image pickup device in which pixels for phase-detection AF that acquire subject information for performing autofocus control in addition to ordinary pixels for acquiring an image are provided in an effective pixel area of a solid-state image pickup device.

SUMMARY

According to a first aspect of the present invention, a solid-state image pickup device includes a plurality of pixels arranged in a two-dimensional matrix, and outputs signals corresponding to the light quantity incident on each of the plurality of pixels. Each of the plurality of pixels includes: a first pixel that is equipped with a first photoelectric conversion means that converts incident light into an electrical signal to store the electrical signal; and a second pixel that is equipped with a second photoelectric conversion means that converts incident light into an electrical signal to store the electrical signal, and a light beam selecting means that selects a light beam that is incident on the second photoelectric conversion means. The solid-state image pickup device includes: a first scanning circuit that performs control of a first exposure operation on the first pixels that simultaneously drives the first photoelectric conversion means of all the first pixels and, after a preset storage time has elapsed, in turn outputs the electrical signals that have been stored in the respective first photoelectric conversion means for each row in which the first pixels are arranged; and a second scanning circuit that performs control of a second exposure operation on the second pixels that, for each row in which the second pixels are arranged, in turn drives the second photoelectric conversion means of the respective second pixels and in turn outputs the electrical signals that have been stored in the respective second photoelectric conversion means. The solid-state image pickup device outputs the electrical signals, which have been stored in the first photoelectric conversion means, as image signals. The solid-state image pickup device outputs the electrical signals, which have been stored in the second photoelectric conversion means, as focus signals.

According to a second aspect of the present invention, in the solid-state image pickup device according to the first aspect, the second scanning circuit may perform control of the second exposure operation during the period in which the first scanning circuit in turn outputs the electrical signals that have been stored in the respective first photoelectric conversion means for each row in which the first pixels are arranged.

According to a third aspect of the present invention, in the solid-state image pickup device according to the second aspect, the second scanning circuit may perform control of the second exposure operation during the period other than the period in which the first scanning circuit simultaneously drives the first photoelectric conversion means of all the first pixels and the period of the storage time.

According to a fourth aspect of the present invention, in the solid-state image pickup device according to any one of the first to third aspect, the circuit elements that constitute the pixels may be formed separated into a first substrate and a second substrate that are electrically connected by a connection portion. The first photoelectric conversion means of the first pixel may be formed in the first substrate. The first pixel may be further provided with a charge storage portion that is formed in the second substrate and that holds the electrical signal that was stored in the first photoelectric conversion means. The second photoelectric conversion means and the light beam selecting means of the second pixel may be formed in the first substrate. The first scanning circuit, after the storage time has elapsed, may simultaneously transfer the electrical signals that have been stored in the first photoelectric storage means of all the first pixels to the corresponding charge storage portions, and afterward output in turn the electrical signals that have been held in the respective charge storage portions for each row in which the first pixels are arranged. The first scanning circuit may output the electrical charges held in the charge storage portions as image signals.

According to a fifth aspect of the present invention, in the solid-state image pickup device according to the fourth aspect, the first pixel may further include a reset means that resets the electrical signal that has been stored in the first photoelectric conversion means. The first scanning circuit may enable the reset by the reset means while the second scanning circuit is performing control of the second exposure operation.

According to a sixth aspect of the present invention, in the solid-state image pickup device according to the fourth or fifth aspect, the second pixel may further include a third photoelectric conversion means that is formed in the second substrate and that converts the incident light that has passed through the first substrate into an electrical signal to stores the electrical signal. The first scanning circuit may simultaneously drive the first photoelectric conversion means of all the first pixels and the third photoelectric conversion means of all the second pixels, and after the storage time has elapsed, simultaneously transfer the electrical signals that have been stored in the first photoelectric conversion means of all the first pixels to the corresponding charge storage portions, and then output in turn the electrical signals that are held in the respective charge storage portions and the electrical signals that are stored in the third photoelectric conversion means for each row in which the first pixels and the second pixels are arranged. The first scanning circuit may output the electrical signals that are held in the charge storage portions and the electrical signals that are stored in the third photoelectric conversion means as image signals.

According to a seventh aspect of the present invention, a control method is for a solid-state image pickup device that has a plurality of pixels arranged in a two-dimensional matrix, and that outputs signals corresponding to the light quantity incident on each of the plurality of pixels. Each of the plurality of pixels includes: a first pixel that is equipped with a first photoelectric conversion means that converts incident light into an electrical signal and stores it; and a second pixel that is equipped with a second photoelectric conversion means that converts incident light into an electrical signal and stores it, and a light beam selecting means that selects the light beam that is incident on the second photoelectric conversion means. The control method includes: a first scanning step that performs control of a first exposure operation on the first pixels by a first scanning circuit that simultaneously drives the first photoelectric conversion means of all the first pixels and, after a preset storage time has elapsed, in turn outputs the electrical signals that have been stored in the respective first photoelectric conversion means for each row in which the first pixels are arranged; and a second scanning step that performs control of a second exposure operation on the second pixels by a second scanning circuit that, for each row in which the second pixels are arranged, in turn drives the second photoelectric conversion means of the respective second pixels, and in turn outputs the electrical signals that have been stored in the respective second photoelectric conversion means. The solid-state image pickup device outputs the electrical signals, which have been stored in the first photoelectric conversion means, as image signals. The solid-state image pickup device outputs the electrical signals, which have been stored in the second photoelectric conversion means, as focus signals.

According to a seventh aspect of the present invention, an image-pickup device includes a solid-state image pickup device that has a plurality of pixels arranged in a two-dimensional matrix, and that outputs signals corresponding to the light quantity incident on each of the plurality of pixels. Each of the plurality of pixels includes: a first pixel that is equipped with a first photoelectric conversion means that converts incident light into an electrical signal to store the electrical signal; and a second pixel that is equipped with a second photoelectric conversion means that converts incident light into an electrical signal to store the electrical signal, and a light beam selecting means that selects the light beam that is incident on the second photoelectric conversion means. The solid-state image pickup device includes: a first scanning circuit that performs control of a first exposure operation on the first pixels that simultaneously drives the first photoelectric conversion means of all the first pixels and, after a preset storage time has elapsed, in turn outputs the electrical signals that have been stored in the respective first photoelectric conversion means for each row in which the first pixels are arranged; and a second scanning circuit that performs control of a second exposure operation on the second pixels that, for each row in which the second pixels are arranged, in turn drives the second photoelectric conversion means of the respective second pixels and in turn outputs the electrical signals that have been stored in the respective second photoelectric conversion means. The solid-state image pickup device outputs the electrical signals that have been stored in the first photoelectric conversion means as image signals. The solid-state image pickup device outputs the electrical signals that have been stored in the second photoelectric conversion means as focus signals.

BRIEF DESCRIPTION OF THE DRAWINGS

The above features and advantages of the present invention will be more apparent from the following description of certain preferred embodiments taken in conjunction with the accompanying drawings, in which:

FIG. 6 is a block diagram that shows the schematic configuration of the solid-state image pickup device in accordance with the second preferred embodiment of the present invention;

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

First Preferred Embodiment

Figure 1:
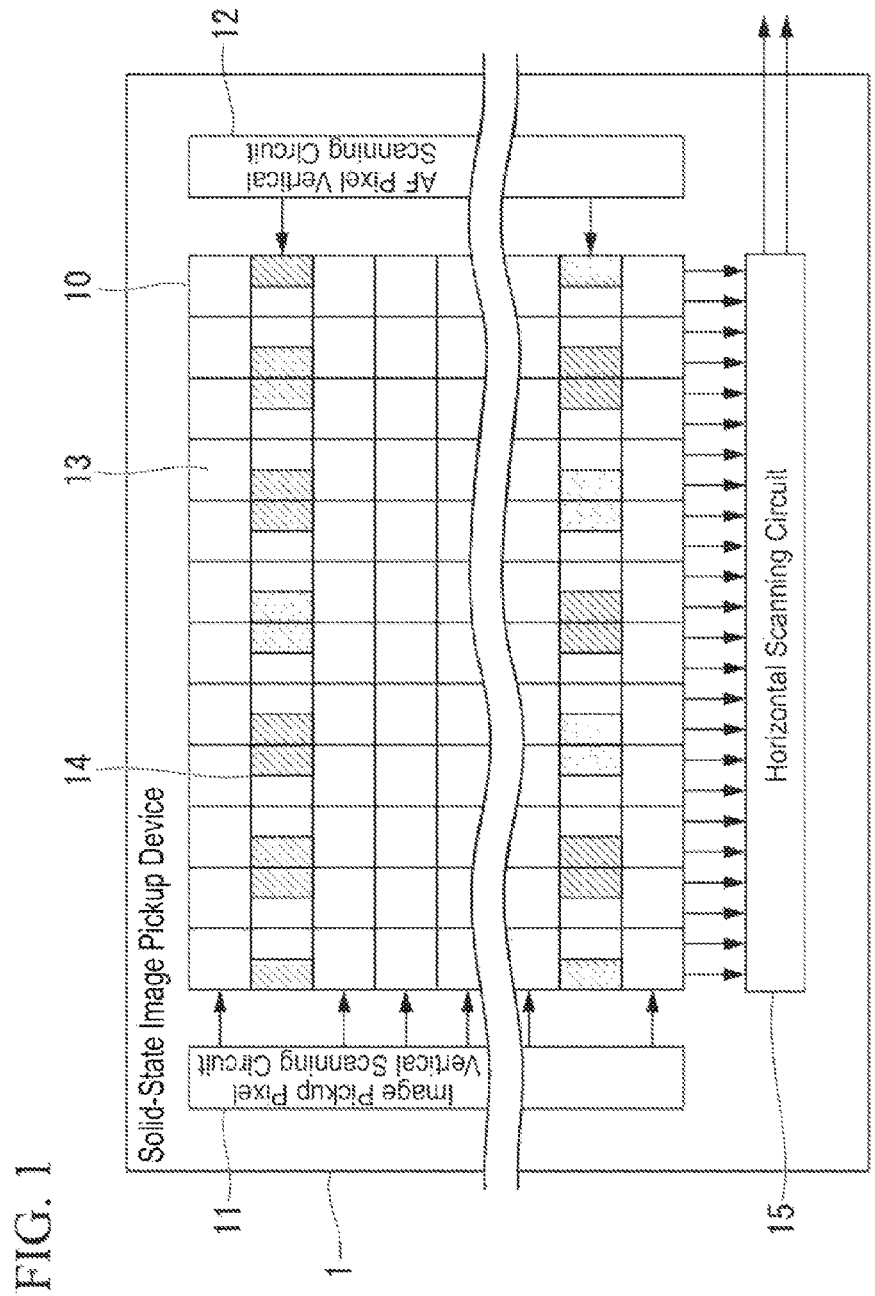
FIG. 1 is a block diagram that shows the schematic configuration of the solid-state image pickup device in accordance with a first preferred embodiment of the present invention.

FIG. 1 is a block diagram that shows a schematic configuration of the solid-state image pickup device in accordance with a first preferred embodiment of the present invention. The solid-state image pickup device of the first preferred embodiment is a MOS-type solid-state image pickup device in which ordinary pixels for imaging a subject (hereinafter, referred to as "image pickup unit pixels") are arrayed in a two-dimensional matrix, and that outputs electrical signals corresponding to the received light quantity (light beam quantity) of the incident subject light. Also, in the solid-state image pickup device in accordance with the first preferred embodiment, besides the image pickup unit pixels, phase-detection AF pixels that are used for auto-focus control (hereinafter, referred to as "AF unit pixels") are arranged at an arbitrary interval. In FIG. 1, the solid-state image pickup device 1 is constituted from a pixel array portion 10 that is constituted by a plurality of image pickup unit pixels 13 and AF unit pixels 14, an image pickup pixel vertical scanning circuit 11, an AF pixel vertical scanning circuit 12, and a horizontal scanning circuit 15. Note that in the following description, the region of the pixel array portion 10 is described as being the effective pixel region (effective pixel area) in the solid-state image pickup device 1.

Each of the image pickup unit pixels 13 in the pixel array portion 10 converts the subject light that is incident into an electrical signal and, in accordance with a control signal that is input from the image pickup pixel vertical scanning circuit 11, outputs an electrical signal proportional to the received light quantity (light beam quantity) of the incident subject light as an image pickup pixel signal to the horizontal scanning circuit 15. Also, in each of the AF unit pixels 14 of the pixel array portion 10, a portion of the subject light is blocked by, for example, a blocking member (light beam selecting means), and it converts to an electrical signal the subject light that is incident from the side that is not blocked. Then, in accordance with a control signal that is input from the AF pixel vertical scanning circuit 12, the AF unit pixel 14 outputs an electrical signal proportional to the partial received light quantity (light beam quantity) of the incident subject light as an AF image signal to the horizontal scanning circuit 15.

Note that as shown in FIG. 1, among the AF unit pixels 14, the subject light of differing directions is blocked by adjacent AF unit pixels 14. That is to say, the direction of subject light that is incident (incident direction) differs between adjacent AF unit pixels 14. Due to the difference in the incident directions of subject light that is incident on the adjacent AF unit pixels 14, the AF pixel signals that adjacent AF unit pixels 14 respectively output come to have a phase differential. In an image pickup device in which the solid-state image pickup device 1 provided, two AF unit pixels 14 that are adjacent are handled as one pair. Thereby, it is possible to perform autofocus control similarly to autofocus control of a system using phase-detection AF sensors, based on the AF pixel signals that each pair of AF unit pixels 14 outputs. FIG. 1 shows an example of a case of the AF unit pixel 14 in which the left side is blocked and the AF unit pixel 14 in which the right side is blocked being alternately arranged in sequence from the left. Note that a detailed description relating to the image pickup unit pixel 13 and the AF unit pixel 14 shall be given below.

The image pickup pixel vertical scanning circuit 11 controls each of the image pickup unit pixels 13 in the pixel array portion 10, and causes the image pickup pixel signal from each image pickup unit pixels 13 to be output to the horizontal scanning circuit 15. The image pickup pixel vertical scanning circuit 11 outputs to the image pickup unit pixels 13 that are provided in the pixel array portion 10 a control signal for performing control so that the image pickup unit pixels 13 perform a global exposure operation.

The AF pixel vertical scanning circuit 12 controls each of the AF unit pixels 14 in the pixel array portion 10, and causes the AF pixel signal from each AF unit pixel 14 to be output to the horizontal scanning circuit 15. The AF pixel vertical scanning circuit 12 outputs to the AF unit pixels 14 that are provided in the pixel array portion 10 a control signal for performing control so that the AF unit pixels 14 perform an operation of line exposure.

Note that a detailed description shall be given below relating to the method of controlling the image pickup unit pixels 13 and the AF unit pixels 14 by the image pickup pixel vertical scanning circuit 11 and the AF pixel vertical scanning circuit 12.

The horizontal scanning circuit 15 in turn outputs to outside of the solid-state image pickup device 1 the image pickup pixel signals that have been respectively input from the image pickup unit pixels 13 in each column of the pixel array portion 10 as image signals of the subject captured by the solid-state image pickup device 1. Also, the horizontal scanning circuit 15 in turn outputs to outside of the solid-state image pickup device 1 AF pixel signals that have been respectively input from the AF unit pixels 14 in each column of the pixel array portion 10 as phase-detection AF signals that are used for autofocus control (hereinafter, referred to as "AF signals").

Figure 2:
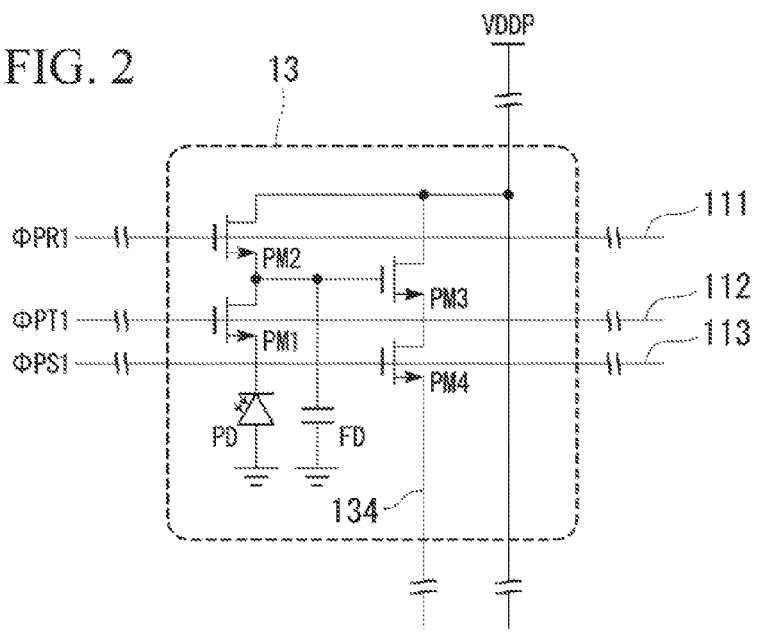
FIG. 2 is a circuit diagram that shows the schematic configuration of the image pickup unit pixel that is provided in the solid-state image pickup device in accordance with the first preferred embodiment of the present invention.
Figure 3:
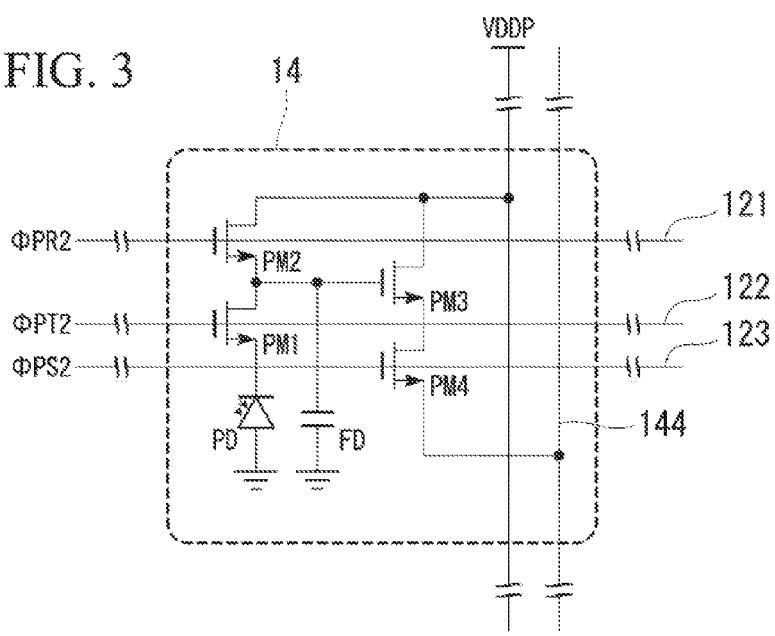
FIG. 3 is a circuit diagram that shows the schematic configuration of the AF image pickup unit pixel that is provided in the solid-state image pickup device in accordance with the first preferred embodiment of the present invention.

Next, the image pickup unit pixel 13 and the AF unit pixel 14 that are provided in the pixel array portion 10 in the solid-state imaging device 1 of the first preferred embodiment shall be described. FIG. 2 is a circuit diagram that shows the schematic configuration of the image pickup unit pixel 13 that is provided in the solid-state image pickup device 1 in accordance with the first preferred embodiment of the present invention. FIG. 3 is a circuit diagram that shows the schematic configuration of the AF unit pixel 14 that is provided in the solid-state image pickup device 1 in accordance with the first preferred embodiment of the present invention.

First, the image pickup unit pixel 13 shall be described. The image pickup unit pixel 13 is a circuit that outputs the image pickup pixel signal, which consists of incident light converted to an electrical signal, to an image pickup pixel vertical signal line 134. Each of the image pickup unit pixels 13 is constituted from a photodiode PD, a pixel charge storage portion FD, a pixel transfer transistor PM1, a pixel reset transistor PM2, a pixel amplification transistor PM3, and a pixel selection transistor PM4.

The pixel charge storage portion FD is a capacitance that belongs to the node that is connected to the gate terminal of the pixel amplification transistor PM3, and is indicated by the symbol for a capacitor in the schematic configuration of the image pickup unit pixel 13 shown in FIG. 2. The schematic configuration of the image pickup unit pixel 13 shown in FIG. 2 is the same constitution as the pixel of a conventional image sensor.

The photodiode PD is a photoelectric conversion portion (photoelectric conversion element) that performs photoelectric conversion of incident light to produce a signal charge.

The pixel charge storage portion FD is a capacitance for storing the signal charge that the photodiode PD has produced.

The pixel transfer transistor PM1 transfers the signal charge that the photodiode PD has produced to the pixel charge storage portion FD that is connected to the gate terminal of the pixel amplification transistor PM3, based on a pixel transfer pulse ϕPT1 that is input from the image pickup pixel vertical scanning circuit 11 via an image pickup pixel transfer line 112. The signal charge that is transferred by the pixel transfer transistor PM1 is stored in the pixel charge storage portion FD.

The pixel amplification transistor PM3 outputs a voltage corresponding to the signal charge that was stored in the pixel charge storage portion FD.

The pixel reset transistor PM2 resets the pixel charge storage portion FD to the power supply potential VDDP based on the pixel reset pulse ϕPR1 that is input from the image pickup pixel vertical scanning circuit 11 via an image pickup pixel reset line 111.

The pixel selection transistor PM4 outputs the voltage that the pixel amplification transistor PM3 has output to an image pickup pixel vertical signal line 134 as the image pickup pixel signal that that image pickup unit pixel 13 outputs, based on a pixel selection pulse ϕPS1 that is input from the image pickup pixel vertical scanning circuit 11 via an image pickup pixel selection line 113.

The image pickup pixel signal that is output to the image pickup pixel vertical signal line 134 is input to the horizontal scanning circuit 15.

The AF unit pixel 14 shall now be described. The AF unit pixel 14 is a circuit that outputs the AF pixel signal, which consists of incident light converted to an electrical signal, to the AF pixel vertical signal line 144. In the AF unit pixel 14, as described above, a portion of the incident subject light is blocked, and it is controlled by the AF pixel vertical scanning circuit 12. However, its constitution other than that is the same as the constitution of the image pickup unit pixel 13 shown in FIG. 2. Accordingly, the constituent elements of the AF unit pixel 14 that are the same as the constituent elements of the image pickup unit pixel 13 shall be denoted by the same reference numerals, and only the operation that differs from the image pickup unit pixel 13 shall be described.

The pixel transfer transistor PM1 transfers the signal charge that the photodiode PD has produced to the pixel charge storage portion FD that is connected to the gate terminal of the pixel amplification transistor PM3, based on a pixel transfer pulse ϕPT2 that is input from the AF pixel vertical scanning circuit 12 via an AF pixel transfer line 122. The signal charge that is transferred by the pixel transfer transistor PM1 is stored in the pixel charge storage portion FD.

The pixel amplification transistor PM3 outputs a voltage corresponding to the signal charge stored in the pixel charge storage portion FD.

The pixel reset transistor PM2 resets the pixel charge storage portion FD to the power supply potential VDDP based on pixel reset pulse ϕPR2 that is input from the AF pixel vertical scanning circuit 12 via an AF pixel reset line 121.

The pixel selection transistor PM4 outputs the voltage that the pixel amplification transistor PM3 has output to the AF pixel vertical signal line 144 as the AF pixel signal that the AF unit pixel 14 outputs, based on the pixel selection pulse ϕPS2 that is input from the AF pixel vertical scanning circuit 12 via an AF pixel selection line 123.

The AF pixel signal that has been output to the AF pixel vertical signal line 144 is input to the horizontal scanning circuit 15.

With this kind of constitution, the solid-state image pickup device 1 of the first preferred embodiment outputs to the outside of the solid-state image pickup device 1 the image pickup pixel signals that the image pickup unit pixels 13 have output and the AF pixel signals that the AF unit pixels 14 have output as image signals and AF signals, respectively.

(Operation Sequence)

Figure 4:
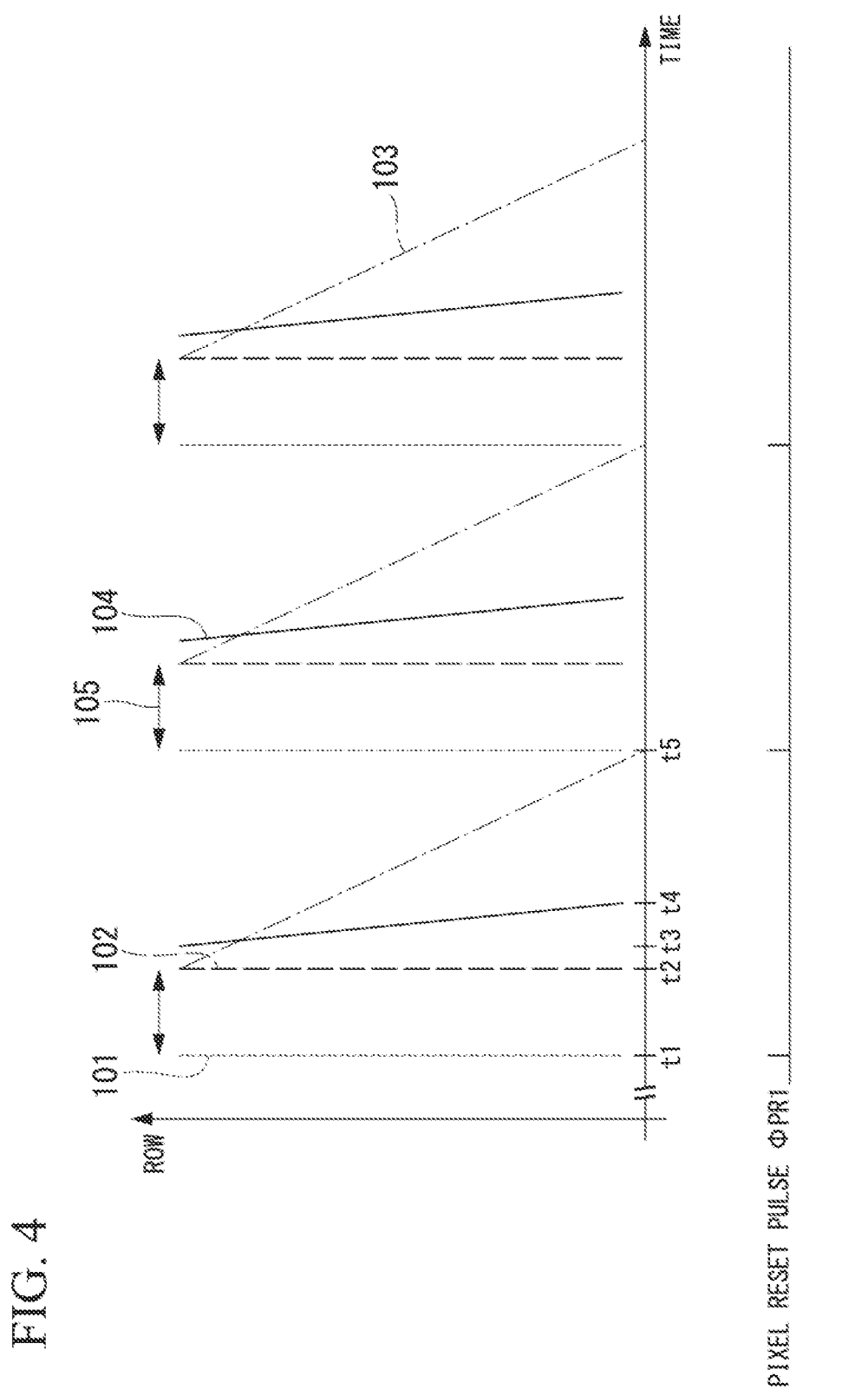
FIG. 4 is a sequence diagram that shows the outline of the operation sequence when performing the operations of reading out of the AF unit pixel and global exposure in the solid-state image pickup device in accordance with the first preferred embodiment of the present invention.

Next, the operation sequence of global exposure in the solid-state image pickup device 1 of the first preferred embodiment shall be described. FIG. 4 is a sequence diagram that shows the outline of the operation sequence when performing the operations of reading out of the AF unit pixel 14 and global exposure in the solid-state image pickup device 1 in accordance with the first preferred embodiment of the present invention. Also shown in the operation sequence diagram for global exposure shown in FIG. 4 is the reset pulse for resetting the image pickup unit pixel 13, more specifically, the pixel reset pulse ϕPR1 that is input from the image pickup pixel vertical scanning circuit 11 to the pixel reset transistor PM2.

In FIG. 4, the horizontal axis denotes time, while the vertical axis denotes the rows of the solid-state image pickup device 1. A sequence 101 shows the image pickup pixel reset operation, a sequence 102 shows the image pickup pixel transfer operation, and a sequence 103 shows the image signal readout operation. Also, a sequence 104 shows the AF signal readout operation. In addition, a storage time 105 shows the exposure period of one time from the image pickup pixel reset operation to the image pickup pixel transfer operation.

In the operation sequence of global exposure in the solid-state image pickup device 1, first at time t1, the image pickup pixel reset operation shown in sequence 101 is performed. In the image pickup pixel reset operation of sequence 101, the signal charges that have been stored in the photodiode PD and the pixel charge storage portion FD in all of the image pickup unit pixels 13 that are provided in the pixel array portion 10 are simultaneously reset.

More specifically, the image pickup pixel vertical scanning circuit 11, by setting the pixel reset pulse φPR1 and the pixel transfer pulse φPT1 of all the rows in the pixel array portion 10 to, for example, the "High" level, puts the pixel reset transistor PM2 and the pixel transfer transistor PM1 in all of the image pickup unit pixels 13 of the pixel array portion 10 into the ON state. Thereby, the photodiode PD and the pixel charge storage portion FD in all of the image pickup units pixels 13 are reset. Subsequently, the image pickup pixel vertical scanning circuit 11, by setting the pixel reset pulse φPR1 and the pixel transfer pulse φPT1 of all the rows in the pixel array portion 10 to, for example, the "Low" level, puts the pixel reset transistor PM2 and the pixel transfer transistor PM1 in all of the image pickup unit pixels 13 of the pixel array portion 10 into the OFF state, and completes the reset of the photodiode PD and the pixel charge storage portion FD in all of the image pickup units pixels 13.

Next, at time t2 at which the storage time 105 that was set in advance has elapsed, the image pickup pixel transfer operation shown in the sequence 102 is performed. In the image pickup pixel transfer operation of the sequence 102, the signal charges produced by the photodiode PD in all of the image pickup unit pixels 13 provided in the pixel array portion 10 are transferred simultaneously to the pixel charge storage portion FD in each image pickup unit pixel 13.

More specifically, the image pickup pixel vertical scanning circuit 11, by inputting for example a "High" level pixel transfer pulse φPT1 to all of the image pickup unit pixels 13 provided in the pixel array portion 10, puts the pixel transfer transistor PM1 in all of the image pickup unit pixels 13 into the ON state. Thereby, the signal charge produced by the photodiode PD in each image pickup unit pixel 13 is transferred to the pixel charge storage portion FD in each image pickup unit pixel 13, and held there. Then, the image pickup pixel vertical scanning circuit 11, by inputting for example a "Low" level pixel transfer pulse φPT1 to all of the image pickup unit pixels 13 provided in the pixel array portion 10, puts the pixel transfer transistor PM1 in all of the image pickup unit pixels 13 into the OFF state, and ends the transfer of signal charges to the pixel charge storage portion FD in each image pickup unit pixel 13.

After that, the image signal readout operation shown in sequence 103 is performed. In the image signal readout operation of sequence 103, the signal charge that is held in the pixel charge storage portion FD in each image pickup unit pixel 13 by sequence 102 is outputted in turn to the horizontal scanning portion 15 as the image pickup pixel signal. Then, the horizontal scanning portion 15 in turn outputs the image pickup pixel signals that were input in turn from the image pick unit pixels 13 to the outside as image signals that the solid-state image pickup device 1 outputs.

More specifically, the image pickup pixel vertical scanning circuit 11, by setting the pixel selection pulse φPS1 to, for example, the "High" level row by row of the image pickup unit pixels 13 that are provided in the pixel array portion 10, in turn puts the pixel selection transistors PM4 in the image pickup unit pixels 13 that output the image pickup pixel signals to the ON state. Thereby, for each row of the pixel array portion 10, the signal charge that is held in the pixel charge storage portion FD in each image pickup unit pixel 13 is outputted in turn to the horizontal scanning circuit 15 via the image pickup pixel vertical signal line 134 of every column of the pixel array portion 10. Then, the horizontal scanning circuit 15 outputs in turn to the outside column by column the image pickup pixel signals that were input row by row from the image pickup unit pixels 13 of every column as image signals that the solid-state image device 1 outputs.

Also, the AF signal readout operation shown in sequence 104 is performed from time t3 after the image pickup pixel transfer operation of sequence 102 is completed. In the AF signal readout operation of sequence 104, the AF pixel signals are output in turn to the horizontal scanning circuit 15 at every row of the pixel array portion 10 that is provided with the AF unit pixels 14, by controlling the AF unit pixels 14 with a line exposure operation.

In the AF signal readout operation of the sequence 104, first the signal charges that have been stored in the photodiode PD and the pixel charge storage portion FD in all of the AF unit pixels 14 that are provided in a row of the pixel array portion 10 that outputs AF pixel signals are simultaneously reset.

More specifically, the AF pixel vertical scanning circuit 12, by setting the pixel reset pulse φPR2 and the pixel transfer pulse φPT2 of a row of the pixel array portion 10 that outputs AF pixel signals to, for example, the "High" level, puts the pixel reset transistor PM2 and the pixel transfer transistor PM1 in all of the AF unit pixels 14 of that row into the ON state. Doing so resets the photodiode PD and the pixel charge storage portion FD in all of the AF unit pixels 14 of that row. After that, the AF pixel vertical scanning circuit 12, by setting the pixel reset pulse φPR2 and the pixel transfer pulse φPT2 of a row of the pixel array portion 10 that outputs AF pixel signals to, for example, the "Low" level, puts the pixel recent transistor PM2 and the pixel transfer transistor PM1 in all of the AF unit pixels 14 of that row into the OFF state, and ends the reset of the photodiode PD and the pixel charge storage portion FD in all of the AF unit pixels 14 of that row. Thereby, all of the AF unit pixels 14 of a row of the pixel array portion 10 that outputs AF pixel signals simultaneously start the exposure of the subject light.

After that, when a storage time that has been set in advance has elapsed, the signal charges produced by the photodiodes PD in all of the AF unit pixels 14 provided in a row of the pixel array portion 10 that outputs AF pixel signals are simultaneously transferred to the pixel charge storage portions FD in the respective AF unit pixels 14.

More specifically, the AF pixel vertical scanning circuit 12, by setting the pixel transfer pulse φPT2 of a row of the pixel array portion 10 that outputs AF pixel signals to, for example, the "High" level, puts the pixel transfer transistor PM1 in all of the AF unit pixels 14 of that row into the ON state. Thereby, the signal charges produced by the photodiodes PD in the respective AF unit pixels 14 of that row are transferred to the pixel charge storage portion FD in the respective AF unit pixels 14, and held there. Then, the AF pixel vertical scanning circuit 12, by setting the pixel transfer pulse φPT2 of a row of the pixel array portion 10 that outputs AF pixel signals to, for example, the "Low" level, puts the pixel transfer transistor PM1 in all of the AF unit pixels 14 of that row into the OFF state, and ends the transfer of signal charges to the pixel charge storage portions FD in the respective AF unit pixels 14 of that row.

After that, the signal charges that are held in the pixel charge storage portions FD in the respective AF unit pixels 14 provided in a row of the pixel array portion 10 that outputs AF pixel signals are in turn output to the horizontal scanning circuit 15 as AF pixel signals.

More specifically, the AF pixel vertical scanning circuit 12, by setting the pixel transfer pulse φPT2 of a row of the pixel array portion 10 that outputs AF pixel signals to, for example, the "High" level, puts the pixel selection transistor PM4 in all of the AF unit pixels 14 of that row into the ON state. Thereby, the signal charges held in the pixel charge storage portions FD in the respective AF unit pixels 14 of that row are output to the horizontal scanning circuit 15 via the AF pixel vertical signal line 144 of each column of the pixel array portion 10. The horizontal scanning circuit 15 in turn outputs to the outside column by column the AF pixel signals input from the AF unit pixels 14 in each column, as the AF signals that the solid-state image pickup device 1 outputs.

Repeating this kind of control of the line exposure operation on the AF unit pixels 14 for each row that the AF unit pixels 14 are arranged in the pixel array portion 10 outputs in turn the AF pixel signals from all of the AF unit pixels 14 that are provided in the pixel array portion 10 to the outside as AF signals that the solid-state image pickup device 1 outputs.

Note that with regard to the AF signal readout operation of the sequence 104, since the number of the AF unit pixels 14 is fewer than the number of the image pickup unit pixels 13 provided in the pixel array portion 10, the output of the AF signals is completed prior to the completion of the output of all the image signals by the image signal readout operation of the sequence 103, for example, at time t4.

After that, at time t5 or later at which the image signal readout operation of the sequence 103 is completed, it is possible to start the operation sequence of global exposure for acquiring the next image. The operation sequence diagram of global exposure shown in FIG. 4 shows the case of starting the operation sequence of global exposure that acquires the next image from the time t5, and continuously acquiring a plurality of images.

In this way, in the operation sequence in the solid-state image pickup device 1 of the first preferred embodiment, it is possible to efficiently acquire a signal for phase-detection AF while performing an exposure operation of a global exposure system. At this time, in the operation sequence the readout of the AF signals is performed by driving the AF unit pixels 14 at a timing that does not influence the global exposure operation of the solid-state image pickup device 1. More specifically, the AF signal readout operation (sequence 104) is not performed during the period of the image pickup pixel transfer operation that transfers the signal charge produced by the photodiode PD in the image pickup unit pixel 13 to the pixel charge storage portion FD (sequence 102), or during the period of the photodiode PD exposing the subject light (storage time 105). Thereby, with the solid-state image pickup device 1 of the first preferred embodiment, it is possible reduce the effect of circuit noise such as signal line coupling noise and power supply and ground noise on the image pickup unit pixels 13, and obtain an image of good image quality with the exposure operation of the global exposure system.

Note that in the operation sequence shown in FIG. 4, the case was described of performing the AF signal readout operation from the AF unit pixels 14 (sequence 104) once in the time from the image pickup pixel transfer operation of the image pickup unit pixels 13 (sequence 102) to the next image pickup pixel reset operation (sequence 101). However, the number of times of the AF signal readout operation from the AF unit pixels 14 is not limited to the number of times of the operation sequence shown in FIG. 4. For example, during the image signal readout operation of the image pickup unit pixels 13 (sequence 103), in the case of there being time to be able to perform the AF signal acquisition operation by the AF unit pixels 14, that is to say, the pixel reset operation, the pixel transfer operation, and the AF signal readout operation of the AF unit pixels 14 (sequence 104), the AF pixel vertical scanning circuit 12 can also perform control that drives the AF unit pixels 14 so as to perform the next AF signal acquisition operation.

Note that in the exposure operation of the global exposure system, as stated above, the signal charges that are produced by the photodiode PD in all of the image pickup unit pixels 13 are read out after performing the exposure of all the image pickup unit pixels. That is to say, the image signal readout operation shown in sequence 103 is performed after resetting the image pickup unit pixels 13 by the image pickup pixel reset operation of the sequence 101 shown in FIG. 4 and, after the storage time 105 has elapsed, performing the image pickup pixel transfer operation of the sequence 102. At this time, in the image pickup unit pixel 13, which requires time from after the exposure of the image pickup unit pixel 13 is completed to the start of the signal charge readout, the time of holding the signal charge in the pixel charge storage portion FD in the image pickup unit pixel 13 is prolonged, and while holding this signal charge, for example, noise caused by light may occur in the pixel charge storage portion FD, and the image signal that the solid-state image pickup device 1 outputs may deteriorate. For this reason, the pixel charge storage portion FD that holds the signal charge is preferably blocked so that the subject light that may become a cause of noise is not incident. Therefore, by forming one solid-state image pickup device with a plurality of chips, and making a structure that overlaps the chips, a solid-state image pickup device with a structure that positions the pixel charge storage portion that holds the charge at blocked position is conceivable.

Second Preferred Embodiment

Figure 5:
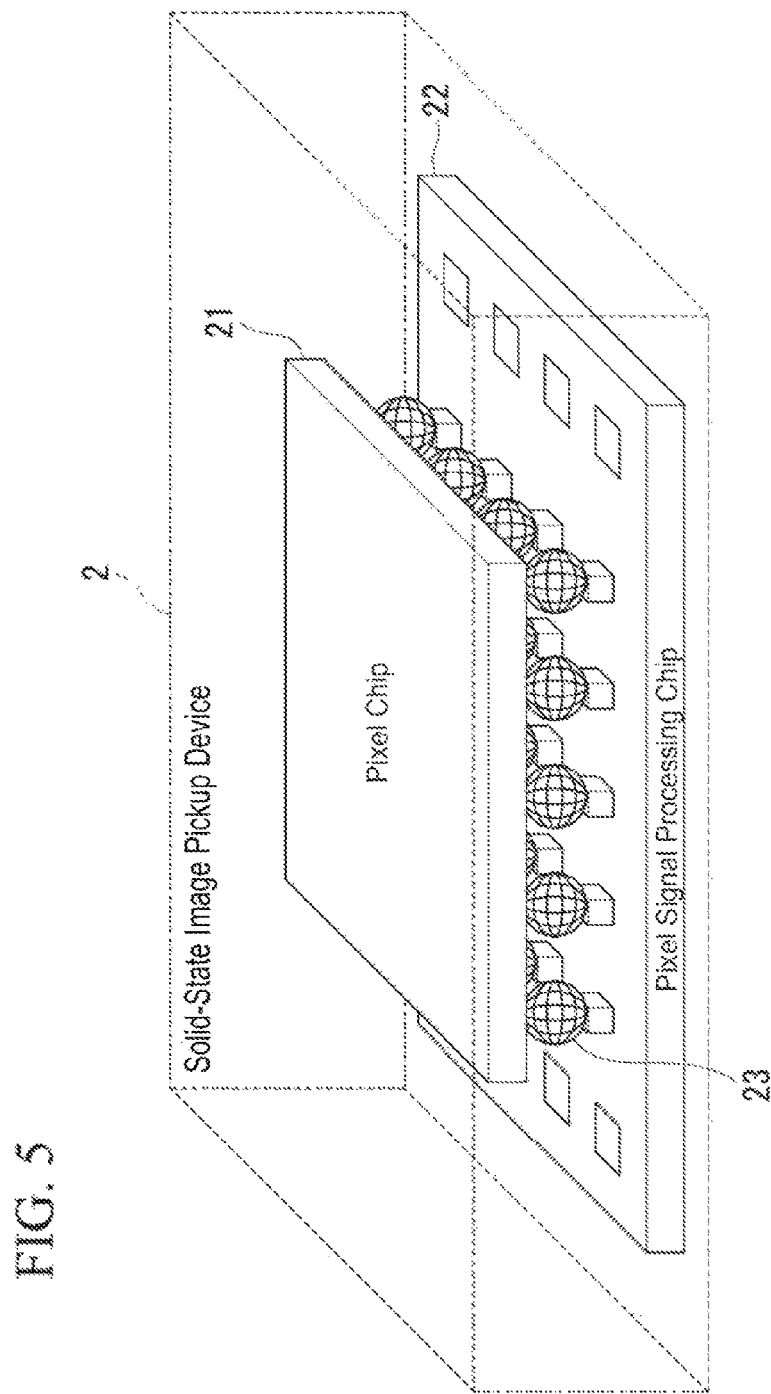
FIG. 5 is an outline drawing that shows the schematic configuration of the solid-state image pickup device in accordance with a second preferred embodiment of the present invention.

Next, the solid-state image pickup device of the second preferred embodiment shall be described. FIG. 5 is an outline drawing that shows the schematic configuration of the solid-state image pickup device in accordance with the second preferred embodiment of the present invention. The solid-state image pickup device 2 of the second preferred embodiment, similarly to the solid-state image pickup device 1 of the first preferred embodiment, is a MOS-type solid-state image pickup device in which a plurality of image pickup unit pixels for imaging a subject are arrayed in a two-dimensional matrix, and that outputs an electrical signal corresponding to the received light quantity (light beam quantity) of the incident subject light. Also, in the solid-state image pickup device 2, similarly to the solid-state image pickup device 1 of the first preferred embodiment, besides the image pickup unit pixels, AF unit pixels are arranged at an arbitrary interval. As shown in FIG. 5, the solid-state image pickup device 2 is constituted from a pixel chip 21, a pixel signal processing chip 22, and a chip connection portion 23.

The pixel chip 21 is a chip in which the image pickup unit pixel described below is arranged in a two-dimensional matrix and that converts incident subject light (incident light) to electrical signals. Also, AF unit pixels are disposed at positions of the pixel that are defined beforehand in the pixel chip 21. The pixel chip 21 is driven and controlled by a signal in the pixel chip 21 or a signal that is transmitted from the pixel signal processing chip 22. The pixel chip 21 transmits (transfers) converted electrical signals to the pixel signal processing chip 22.

The pixel signal processing chip 22 is a chip that performs processes such as temporary storage of the electrical signal that has been transmitted (transferred) from the image pickup unit pixel of the pixel chip 21 (holding), integration and simple operations on the electrical signal. Moreover, the pixel signal processing chip 22 transmits a signal for driving and controlling the pixel chip 21 to the pixel chip 21.

The chip connection portion 23 is a connection portion for electrically connecting the pixel chip 21 and the pixel signal-processing chip 22. The chip connection portion 23 uses bumps or the like manufactured for example by vacuum deposition or electroplating. Note that a chip connection portion 23 may have a constitution that connects an electrode arranged at a pixel chip 11 (first electrode) and an electrode arranged at a pixel signal processing chip 12 (second electrode). Also, an insulating member such as an adhesive may be filled in the space that exists between the pixel chip 21 and the pixel signal processing chip 22. The pixel chip 21 and the pixel signal-processing chip 22 perform transmission and reception of signals via the chip connection portion 23.

Here, the constitution of the solid-state image pickup device 2 of the second preferred embodiment shall be described in further detail.

FIG. 6 is a block diagram that shows the schematic configuration of the solid-state image pickup device 2 in accordance with the second preferred embodiment of the present invention. As shown in FIG. 6, the solid-state image pickup device 2 is constituted from a pixel array portion 210 that is constituted by a plurality of image pickup unit pixels 213 and AF unit pixels 14, a pixel chip 21 that is constituted from an image pickup pixel vertical scanning circuit 211, an AF pixel vertical scanning circuit 12, and a pixel chip horizontal scanning circuit 215, and a pixel signal processing chip 22 that is constituted from a memory array portion 220 that is constituted by a plurality of image pickup unit memory cells 223, a memory vertical scanning circuit 221, and a pixel signal processing chip horizontal scanning circuit 225. In the solid-state image pickup device 2 in accordance with the second preferred embodiment, an ordinary pixel for imaging a subject is constituted by the image pickup unit pixel 213 and the image pickup unit memory cell 223. Note that in the following description, the region of the pixel array portion 210 shall be described as being the effective pixel region (effective pixel area) in the solid-state image pickup device 2.

Note that with regard to the solid-state image pickup device 2 of the second preferred embodiment, although one solid-state image pickup device 2 is constituted by two chips (the pixel chip 21 and the pixel signal processing chip 22), some constituent elements may be the same as the solid-state image pickup device 1 of the first preferred embodiment. Accordingly, of the constituent elements of the solid-state image pickup device 2 of the second preferred embodiment, only the constituent elements that differ from the solid-state image pickup device 1 of the first preferred embodiment shall be described. Constituent elements that are the same as those of the solid-state image pickup device 1 of the first preferred embodiment shall be denoted by the same reference numerals, and detailed descriptions thereof shall be omitted.

The respective image pickup unit pixels 213 in the pixel array portion 210 convert subject light that is incident into electrical signals, similarly to the image pickup unit pixels 13 in the pixel array portion 10 that is provided in the solid-state image pickup device 1 of the first preferred embodiment. The image pickup unit pixel 213 outputs an image pickup pixel signal proportional to the received light quantity (light beam quantity) of the incident subject light to the corresponding image pickup unit memory cell 223 in the memory array portion 220 of the pixel signal processing chip 22, via the chip connection portion 23, in accordance with a control signal that is input from the image pickup pixel vertical scanning circuit 211. Note that a detailed description relating to the image pickup unit pixel 213 is given below.

Also, the respective AF unit pixels 14 of the pixel array portion 210 output an AF pixel signal proportional to the received light quantity (light beam quantity) of a portion of the subject light that is incident from the side that is not blocked, in the same manner as the solid-state image pickup device 1 of the first preferred embodiment, to the pixel chip horizontal scanning circuit 215 in accordance with a control signal that is input from the AF pixel vertical scanning circuit 12.

The image pickup pixel vertical scanning circuit 211, in accordance with the control signal that is input from the pixel signal processing chip horizontal scanning circuit 225 in the pixel signal processing chip 22, controls the respective image pickup unit pixels 213 in the pixel array portion 210 to cause the image pickup pixel signal from each image pickup unit pixel 213 to be output to the corresponding image pickup unit memory cell 223. The image pickup pixel vertical scanning circuit 211 outputs to the image pickup unit pixels 213 that are provided in the pixel array portion 210 a control signal for performing control so that the image pickup unit pixels 213 perform a global exposure operation.

The pixel chip horizontal scanning circuit 215 in turn outputs to outside of the solid-state image pickup device 2 the AF pixel signals that have been respectively input from the AF unit pixels 14 in each column of the pixel array portion 210 as AF signals.

Each image pickup unit memory cell 223 in the memory array portion 220 holds the image pickup pixel signal inputted via the chip connection portion 23 from the corresponding image pickup unit pixel 213 in the pixel array portion 210 of the pixel chip 21. The image pickup unit memory cell 223 outputs the image pickup pixel signal that it holds as the image pickup memory signal to the pixel signal processing chip horizontal scanning circuit 225 in accordance with a control signal inputted from the memory vertical scanning circuit 221. Note that a detailed description relating to the image pickup unit memory cell 223 follows below.

The memory vertical scanning circuit 221 controls each image pickup unit memory cell 223 in the memory array portion 220 to cause the image pickup pixel signal (image pickup memory signal) that is held to each image pickup unit memory cell 223 to be output to the pixel signal processing chip horizontal scanning circuit 225. The memory vertical scanning circuit 221 outputs a control signal for performing control so that the image pickup unit memory cells 223 perform a global exposure operation to the image pickup unit memory cells 223 provided in the memory array portion 220.

The pixel signal processing chip horizontal scanning circuit 225 in turn outputs to outside of the solid-state image pickup device 2 the image pickup memory signals that have been respectively input from the image pickup unit memory cells 223 in each column of the memory array portion 220 as image signals of the subject captured by the solid-state image pickup device 2.

Figure 7:
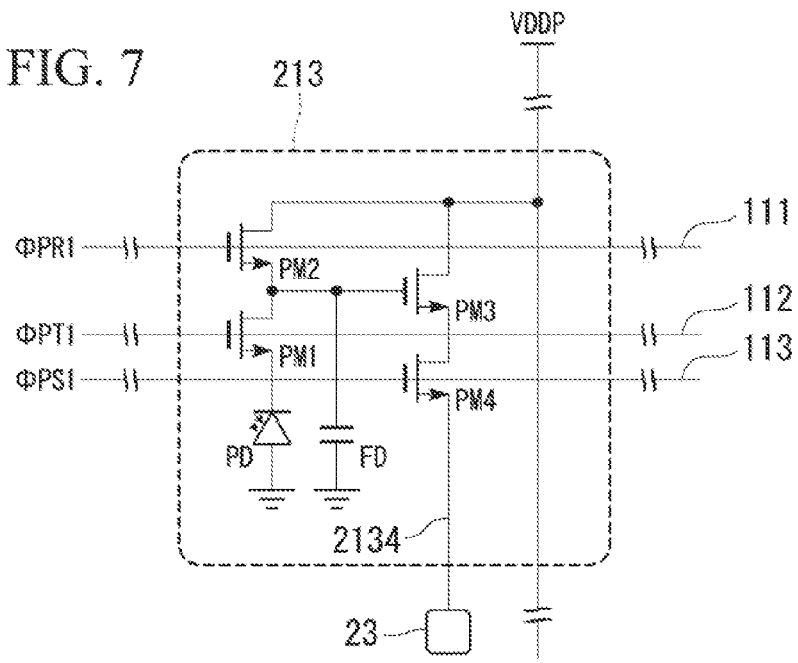
FIG. 7 is a circuit diagram that shows the schematic configuration of the image pickup unit pixel in the pixel chip that is provided in the solid-state image pickup device in accordance with the second preferred embodiment of the present invention.
Figure 8:
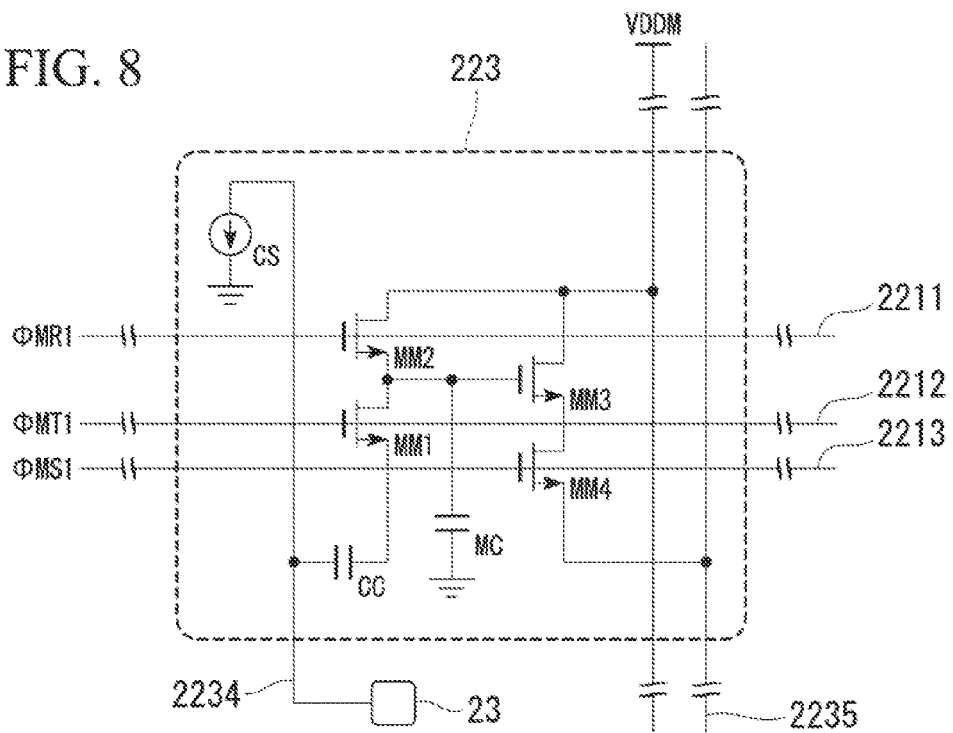
FIG. 8 is a circuit diagram that shows the schematic configuration of the image pickup unit memory in the image signal processing chip that is provided in the solid-state image pickup device in accordance with the second preferred embodiment of the present invention.

Next, a description shall be given for the ordinary pixel for imaging a subject in the solid-state image pickup device 2 of the second preferred embodiment, that is to say, the image pickup unit pixel 213 that is provided in the pixel array portion 210 in the pixel chip 21, and the image pickup unit memory cell 223 that is provided in the memory array portion 220 in the pixel signal processing chip 22. FIG. 7 is a circuit diagram that shows the schematic configuration of the image pickup unit pixel 213 in the pixel chip 21 that is provided in the solid-state image pickup device 2 in accordance with the second preferred embodiment. FIG. 8 is a circuit diagram that shows the schematic configuration of the image pickup unit memory cell 223 in the image signal processing chip 22 that is provided in the solid-state image pickup device 2 in accordance with the second preferred embodiment.

First, the image pickup unit pixel 213 shall be described. The image pickup unit pixel 213 is a circuit that outputs the image pickup pixel signal, which consists of incident light converted to an electrical signal, to an image pickup pixel vertical signal line 2134, similarly to the image pickup unit pixel 13 of the solid-state image pickup device 1 of the first preferred embodiment. One end of the image pickup pixel vertical signal line 2134 is connected to the chip connection portion 23, and so it transmits (transfers) the image pickup pixel signal that was output from the image pickup unit pixel 213 to the corresponding image pickup unit memory 223.

The driving of the respective constituent elements of the image pickup unit pixel 213 is controlled by control signals input from the image pickup pixel vertical scanning circuit 211. The difference between the constitution of the image pickup unit pixel 213 and the image pickup unit pixel 13 shown in FIG. 2 is that the image pickup pixel vertical signal line 134 of the image pickup unit pixel 13 is substituted for the image pickup pixel vertical signal line 2134, and the image pickup pixel vertical signal line 2134 is connected to the chip connection portion 23. Accordingly, the constituent elements and signal lines of the image pickup unit pixel 213 that are the same as the image pickup unit pixel 13 shown in FIG. 2 are denoted by the same reference numerals, and so detailed descriptions thereof shall be omitted.

Next, the image pickup unit memory cell 223 shall be described. The image pickup unit memory cell 223 is a circuit that holds the image pickup pixel signal that is inputted via the chip connection portion 23, and outputs the image pickup pixel signal that it has held to an image pickup memory vertical signal line 2235 as an image pickup memory signal. As shown in FIG. 8, the image pickup unit memory cell 223 is constituted from an image pickup unit memory coupling capacitor CC, a memory charge storage portion MC, a memory transfer transistor MM1, a memory reset transistor MM2, a memory amplification transistor MM3, a memory selection transistor MM4, and an image pickup unit memory current load CS.

The image pickup unit memory cell coupling capacitance CC is a coupling capacitance in which one end is connected to the chip connection portion 23, and the other end is connected to the source terminal of the memory transfer transistor MM1. The memory charge storage portion MC is a capacitance that stores a signal charge. The memory charge storage portion MC stores the signal charge corresponding to the photodiode PD in the image pickup unit pixel 213, that is to say, an image pickup pixel signal.

The memory transfer transistor MM1 transfers the signal charge that was produced at one end of the image pickup unit memory cell coupling capacitance CC to the memory charge storage portion MC that is connected to the gate terminal of the memory amplification transistor MM3, based on a memory transfer pulse φMT1 that is input from the memory vertical scanning circuit 221 via an image pickup memory transfer line 2212. The signal charge that is transferred via the memory transfer transistor MM1 is stored in the memory charge storage portion MC.

The memory amplification transistor MM3 outputs a voltage corresponding to the signal charge that was stored in the memory charge storage portion MC.

The memory reset transistor MM2 resets the memory charge storage portion MC to the power supply potential VDDM, based on a memory reset pulse φMR1 that is input from the memory vertical scanning circuit 221 via an image pickup memory reset line 2211.

The memory selection transistor MM4 outputs the voltage that the memory amplification transistor MM3 has output to an image pickup memory vertical signal line 2235 as the image pickup memory signal that the image pickup unit memory cell 223 has output, based on a memory selection pulse φMS1 that is input from the memory vertical scanning circuit 221 via an image pickup memory selection line 2213.

The image pickup memory signal that is output to the image pickup memory vertical signal line 2235 is input to the pixel signal processing chip horizontal scanning circuit 225.

In the image pickup unit memory current load CS, one end is connected to an image pickup pixel memory signal line 2234, while the other end is connected to the ground of the pixel signal processing chip 32. The image pickup unit memory current load CS drives the signal line connected to the chip connection portion 23 with a fixed current. Note that the image pickup unit memory current load CS may have a constitution in which one end is connected to the image pickup pixel vertical signal line 2134 of the pixel chip 21, and the other end is connected to the ground of the pixel chip 21.

The image pickup pixel memory signal line 2234 is connected to the chip connection portion 23.

With such a constitution, in the solid-state image pickup device 2 of the second preferred embodiment, the pixel signal processing chip horizontal scanning circuit 225 outputs the image pickup memory signal that the image pickup unit memory cell 223 has output to the outside of the solid-state image pickup device 2 as an image signal, and the pixel chip horizontal scanning circuit 215 outputs the AF pixel signal that the AF unit pixel 14 has output to the outside of the solid-state image pickup device 2 as an AF signal.

(First Operation Sequence)

Figure 9:
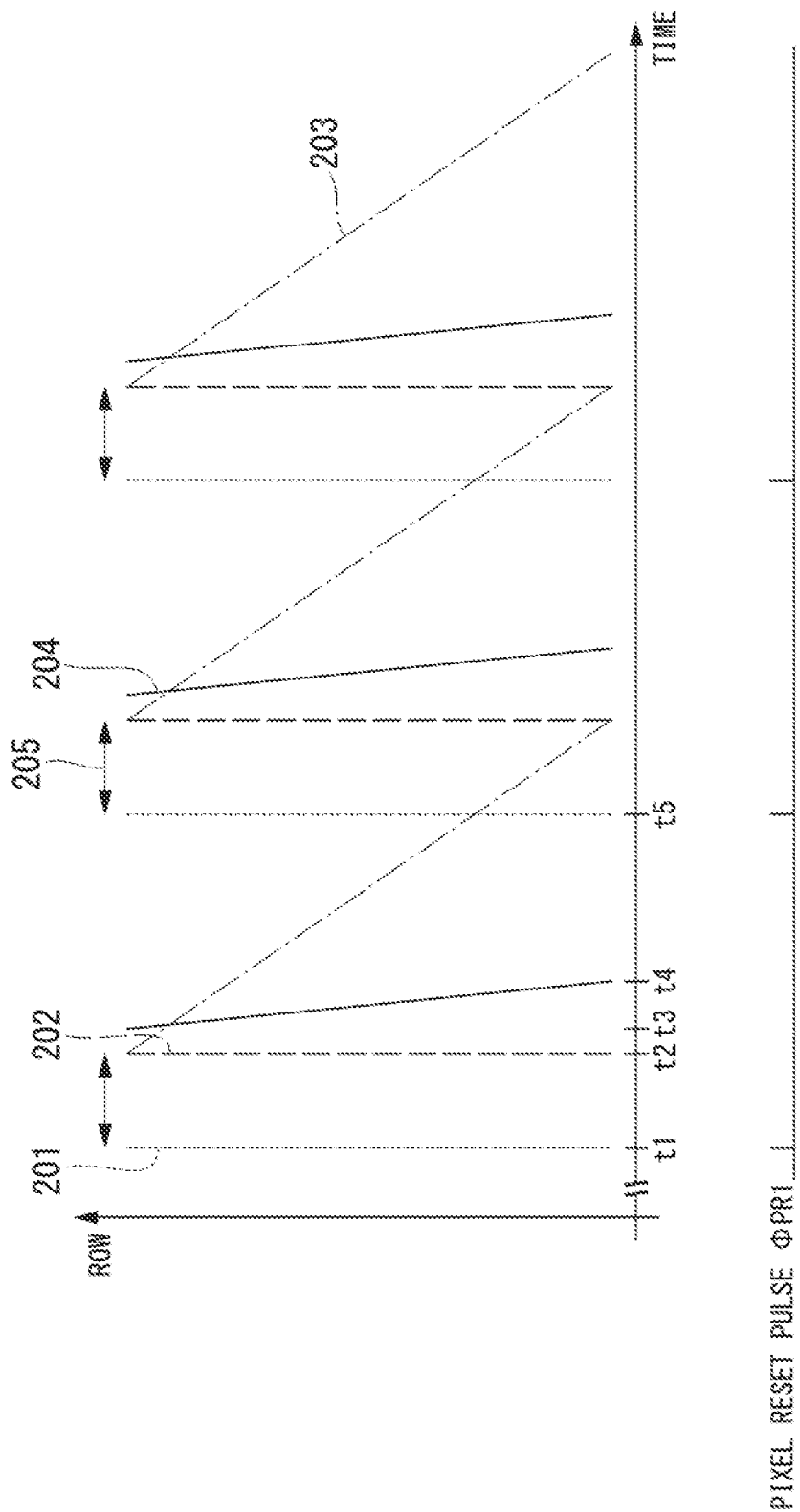
FIG. 9 is a sequence diagram that shows an outline of the first operation sequence when performing the operations of reading out of the AF unit pixel and global exposure in the solid-state image pickup device in accordance with the second preferred embodiment of the present invention.

Next, the first operation sequence of global exposure in the solid-state image pickup device 2 of the second preferred embodiment shall be described. FIG. 9 is a sequence diagram that shows an outline of the first operation sequence when performing the operations of reading out of the AF unit pixel 14 and global exposure in the solid-state image pickup device 2 in accordance with the second preferred embodiment of the present invention. Also shown in the first operation sequence diagram for global exposure shown in FIG. 9 is the reset pulse for resetting the image pickup unit pixel 213, more specifically, the pixel reset pulse φPR1 that is input from the image pickup pixel vertical scanning circuit 211 to the pixel reset transistor PM2.

In FIG. 9, the horizontal axis denotes time, while the vertical axis denotes the rows of the solid-state image pickup device 2. A sequence 201 shows the image pickup pixel reset operation, a sequence 202 shows the image pickup pixel transfer operation, and a sequence 203 shows the image signal readout operation. Also, a sequence 204 shows the AF signal readout operation. In addition, a storage time 205 shows the exposure period of one time from the image pickup pixel reset operation to the image pickup pixel transfer operation.

In the first operation sequence of global exposure in the solid-state image pickup device 2, first at time t1, the image pickup pixel reset operation shown in sequence 201 is performed. In the image pickup pixel reset operation of sequence 201, the signal charges that have been stored in the photodiode PD and the pixel charge storage portion FD in all of the image pickup unit pixels 213 that are provided in the pixel array portion 210, and the signal charges that have been stored in the image pickup unit memory cell coupling capacitance CC and the memory charge storage portion MC in all of the image pickup unit memory cells 223 that are provided in the memory array portion 220 are simultaneously reset.

More specifically, the image pickup pixel vertical scanning circuit 211, by setting the pixel reset pulse φPR1 and the pixel transfer pulse φPT1 of all the rows in the pixel array portion 210 to, for example, the "High" level, puts the pixel reset transistor PM2 and the pixel transfer transistor PM1 in all of the image pickup unit pixels 213 provided in the pixel array portion 210 into the ON state, and resets the photodiode PD and the pixel charge storage portion FD in all of the image pickup unit pixels 213. Also, the memory vertical scanning circuit 221, by setting the memory reset pulse φMR1 and the memory transfer pulse φMT1 of all the rows of the memory array portion 220 to, for example, the "High" level, puts the memory reset transistor MM2 and the memory transfer transistor MM1 in all of the image pickup unit memory cells 223 that are provided in the memory array portion 220 into the ON state, and resets the image pickup unit memory cell coupling capacitance CC and the memory charge storage portion MC in all of the image pickup unit memory cells 223. Subsequently, the image pickup pixel vertical scanning circuit 2111, by setting the pixel reset pulse φPR1 and the pixel transfer pulse φPT1 of all the rows in the pixel array portion 210 to, for example, the "Low" level, puts the pixel reset transistor PM2 and the pixel transfer transistor PM1 in all of the image pickup unit pixels 213 provided in the pixel array portion 210 into the OFF state, and completes the reset of the photodiode PD and the pixel charge storage portion FD in all of the image pickup unit pixels 213. Also, the memory vertical scanning circuit 221, by setting the memory reset pulse φMR1 and the memory transfer pulse φMT1 of all the rows of the memory array portion 220 to, for example, the "Low" level, puts the memory reset transistor MM2 and the memory transfer transistor MM1 in all of the image pickup unit memory cells 223 that are provided in the memory array portion 220 into the OFF state, and resets the image pickup unit memory cell coupling capacitance CC and the memory charge storage portion MC in all of the image pickup unit memory cells 223.

Next, at time t2 at which the storage time 205 that was set in advance has elapsed, the image pickup pixel transfer operation shown in the sequence 202 is performed. In the image pickup pixel transfer operation of the sequence 202, the signal charges produced by the photodiode PD in all of the image pickup unit pixels 213 provided in the pixel array portion 210 are transferred simultaneously to the pixel charge storage portion FD in each image pickup unit pixel 213. Thereby, the image pickup pixel signals respectively output by the image pickup unit pixels 213 are simultaneously transmitted (transferred) to the corresponding image pickup unit memory cells 223.

More specifically, the image pickup pixel vertical scanning circuit 211, by inputting for example a "High" level pixel transfer pulse φPT1 to all of the image pickup unit pixels 213 provided in the pixel array portion 210, puts the pixel transfer transistor PM1 in all of the image pickup unit pixels 213 into the ON state. Thereby, the signal charge produced by the photodiode PD in each image pickup unit pixel 213 is transferred to the pixel charge storage portion FD in each image pickup unit pixel 213, and held there. Then, the image pickup pixel vertical scanning circuit 211, by inputting for example a "Low" level pixel transfer pulse φPT1 to all of the image pickup unit pixels 213 provided in the pixel array portion 210, puts the pixel transfer transistor PM1 in all of the image pickup unit pixels 213 into the OFF state, and ends the transfer of signal charges to the pixel charge storage portion FD in each image pickup unit pixel 213. After that, the image pickup pixel vertical scanning circuit 211, by inputting for example a "High" level pixel selection pulse φPS1 to all of the image pickup unit pixels 213 provided in the pixel array portion 210, puts the pixel selection transistor PM4 in all of the image pickup unit pixels 213 into the ON state. Thereby, a voltage corresponding to the signal charge that has been stored in the pixel charge storage portion FD that the pixel amplification transistor PM3 in each image pickup unit pixel 213 outputs is output to the image pickup pixel vertical signal line 2134 as an image pickup pixel signal, and transmitted to the image pickup pixel memory signal line 2234 via the chip connection portion 23. The memory vertical scanning circuit 221, by inputting for example a "High" level memory transfer pulse φMT1 to all of the image pickup unit memory units 223 provided in the memory array portion 220, puts the memory transfer transistor MM1 in all of the image pickup unit memory units 223 into the ON state. Thereby, the signal charge that is produced at one end of the image pickup unit memory cell coupling capacitance CC in each of the image pickup unit memory units 223, that is, the voltage corresponding to the image pickup pixel signal transmitted to the image pickup pixel memory signal line 2234, is transferred to the memory charge storage portion MC and held there.

After that, the image signal readout operation shown in sequence 203 is performed. In the image signal readout operation of sequence 203, the signal charge that is held in the memory charge storage portion MC in each image pickup unit memory units 223 by sequence 202 is outputted in turn to the pixel signal processing chip horizontal scanning circuit 225 as the image pickup memory signal. Then, the pixel signal processing chip horizontal scanning circuit 225 in turn outputs the image pickup memory signals that were input in turn from the image pickup unit memory units 223 to the outside as image signals that the solid-state image pickup device 2 outputs.

More specifically, the image pickup pixel vertical scanning circuit 211, by setting the memory selection pulse φMS1 to, for example, the "High" level row by row of the image pickup unit memory cells 223 that are provided in the memory array portion 220, in turn puts the memory selection transistor MM4 in the image pickup unit memory cells 223 that output the image pickup memory signals to the ON state. Thereby, for each row of the memory array portion 220, the signal charge that is held in the memory charge storage portion MC in each image pickup unit memory unit 223 is outputted in turn to the pixel signal processing chip horizontal scanning circuit 225 via the image pickup memory vertical signal line 2235 of every column of the memory array portion 220. Then, the pixel signal processing chip horizontal scanning circuit 225 outputs in turn to the outside column by column the image pickup memory signals that were input row by row from the image pickup unit memory units 223 of every column as image signals that the solid-state image device 2 outputs.

Also, the AF signal readout operation shown in sequence 204 is performed from time t3 after the image pickup pixel transfer operation of sequence 202 is completed. In the AF signal readout operation of sequence 204, the AF pixel signals are output in turn to the pixel chip horizontal scanning circuit 215 at every row of the pixel array portion 210 that is provided with the AF unit pixels 14, by controlling the AF unit pixels 14 with a line exposure operation, in the same manner as the operation sequence in the solid-state image pickup device 1 of the first preferred embodiment.

In the AF signal readout operation of the sequence 204, first the signal charges that have been stored in the photodiode PD and the pixel charge storage portion FD in all of the AF unit pixels 14 that are provided in a row of the pixel array portion 210 that outputs AF pixel signals are simultaneously reset, in the same manner as the AF signal readout operation (sequence 104) in the solid-state image pickup device 1 of the first preferred embodiment shown in FIG. 4.

More specifically, the AF pixel vertical scanning circuit 12, by setting the pixel reset pulse φPR2 and the pixel transfer pulse φPT2 of a row of the pixel array portion 210 that outputs AF pixel signals to, for example, the "High" level, puts the pixel reset transistor PM2 and the pixel transfer transistor PM1 in all of the AF unit pixels 14 of that row into the ON state. Doing so resets the photodiode PD and the pixel charge storage portion FD in all of the AF unit pixels 14 of that row. After that, the AF pixel vertical scanning circuit 12, by setting the pixel reset pulse φPR2 and the pixel transfer pulse φPT2 of a row of the pixel array portion 210 that outputs AF pixel signals to for example, the "Low" level, puts the pixel recent transistor PM2 and the pixel transfer transistor PM1 in all of the AF unit pixels 14 of that row into the OFF state, and ends the reset of the photodiode PD and the pixel charge storage portion FD in all of the AF unit pixels 14. Thereby, all of the AF unit pixels 14 of a row of the pixel array portion 210 that outputs AF pixel signals simultaneously start the exposure of the subject light.

After that, when a storage time that has been set in advance has elapsed, the signal charges produced by the photodiodes PD in all of the AF unit pixels 14 provided in a row of the pixel array portion 210 that outputs AF pixel signals are simultaneously transferred to the pixel charge storage portions FD in the respective AF unit pixels 14, in the same manner as the AF signal readout operation (sequence 104) in the solid-state image pickup device 1 of the first preferred embodiment shown in FIG. 4.

More specifically, the AF pixel vertical scanning circuit 12, by setting the pixel transfer pulse φPT2 of a row of the pixel array portion 210 that outputs AF pixel signals to, for example, the "High" level, puts the pixel transfer transistor PM1 in all of the AF unit pixels 14 of that row into the ON state. Thereby, the signal charges produced by the photodiodes PD in the respective AF unit pixels 14 of that row are transferred to the pixel charge storage portion FD in the respective AF unit pixels 14, and held there. Then, the AF pixel vertical scanning circuit 12, by setting the pixel transfer pulse φPT2 of a row of the pixel array portion 210 that outputs AF pixel signals to for example, the "Low" level, puts the pixel transfer transistor PM1 in all of the AF unit pixels 14 of that row into the OFF state, and ends the transfer of signal charges to the pixel charge storage portions FD in the respective AF unit pixels 14 of that row.

After that, the signal charges that are held in the pixel charge storage portions FD in all of the AF unit pixels 14 provided in a row of the pixel array portion 210 that outputs AF pixel signals are in turn output to the pixel chip horizontal scanning circuit 215 as AF pixel signals.

More specifically, the AF pixel vertical scanning circuit 12, by setting the pixel selection pulse φPS2 of a row of the pixel array portion 210 that outputs AF pixel signals to, for example, the "High" level, puts the pixel selection transistor PM4 in all of the AF unit pixels 14 of that row into the ON state. Thereby, the signal charges held in the pixel charge storage portions FD in the respective AF unit pixels 14 of that row are output to the pixel chip horizontal scanning circuit 215 via the AF pixel vertical signal line 144 in each column of the pixel array portion 210. The pixel chip horizontal scanning circuit 215 in turn outputs to the outside column by column each AF pixel signal input from the AF unit pixel 14 in each column, as the AF signal that the solid-state image pickup device 2 outputs.

Repeating this kind of control of the line exposure operation on the AF unit pixels 14 for each row that the AF unit pixels 14 are arranged in the pixel array portion 210 outputs in turn the AF pixel signals from all of the AF unit pixels 14 that are provided in the pixel array portion 210 to the outside as AF signals that the solid-state image pickup device 2 outputs.

Note that with regard to the AF signal readout operation of the sequence 204, since the number of the AF unit pixels 14 is fever than the number of the image pickup unit pixels 213 and image pickup unit memory cells 223 provided in the pixel array portion 210, the output of the AF signals is completed prior to the completion of the output of all the image signals by the image signal readout operation of the sequence 203, for example, at time t4.

After that, at time t4 or later at which the AF signal readout operation of the sequence 204 is completed, it is possible to start the first operation sequence of global exposure for obtaining the next image. This is because the signal charge that the photodiode PD has produced in each image pickup unit pixel 213 in the solid-state image pickup device 2 is held in the memory charge storage portion MC of the corresponding image pickup unit memory unit 223. More specifically, in the solid-state image pickup device 1 of the first preferred embodiment, the signal charge produced by the photodiode PD in each image pickup unit pixel 13 provided in the pixel array portion 10 is held in the pixel charge storage portion FD in each image pickup unit pixel 13. In contrast, in the solid-state image pickup device 2, the signal charges produced by the photodiodes PD in the image pickup unit pixels 213 provided in the pixel array portion 210 are transferred to the pixel charge storage portion FD in the respective image pickup unit pixels 213 by the image pickup pixel transfer operation of the sequence 202, and moreover transmitted (transferred) to the corresponding image pickup unit memory cells 223 to be held in the memory charge storage portion MC in each image pickup unit memory cell 223. Thereby, in the solid-state image pickup device 2, it is possible to start the first operation sequence of global exposure for obtaining the next image, even in the state of the output to the pixel signal processing chip horizontal scanning circuit 225 of the image pickup memory signals held in the memory charge storage portion MC in each image pickup unit memory cell 223 not being completed. The first operation sequence of global exposure shown in FIG. 9 shows the case of starting the first operation sequence of global exposure that acquires the next image from the time t5 at which the image signal readout operation of sequence 203 is not completed, and continuously acquiring a plurality of images.

In this way, in the first operation sequence in the solid-state image pickup device 2 of the second preferred embodiment, it is possible to efficiently acquire a signal for phase-detection AF while performing an exposure operation of the global exposure system, in the same manner as the operation sequence of global exposure in the solid-state image pickup device 1 of the first preferred embodiment. At this time, in the first operation sequence the readout of the AF signals is performed by driving the AF unit pixels 14 at a timing that does not influence the global exposure operation of the solid-state image pickup device 2, in the same manner as the operation sequence of global exposure in the solid-state image pickup device 1 of the first preferred embodiment shown in FIG. 4. More specifically, the AF signal readout operation (sequence 204) is not performed during the period of the image pickup pixel transfer operation that transfers the signal charge produced by the photodiode PD in the image pickup unit pixel 213 to the pixel charge storage portion FD, and moreover transmits (transfers) it to the corresponding memory charge storage portion MC (sequence 202), or during the period of the photodiode PD exposing the subject light (storage time 205). Thereby, even in the solid-state image pickup device 2 of the second embodiment, it is possible reduce the effect of circuit noise such as signal line coupling noise and power supply and ground noise on the image pickup unit pixels 213 and the image pickup unit memory cells 223, and obtain an image of good image quality with the exposure operation of the global exposure system, in the same manner as the solid-state image pickup device 1 of the first embodiment.

(Second Operation Sequence)

Figure 10:
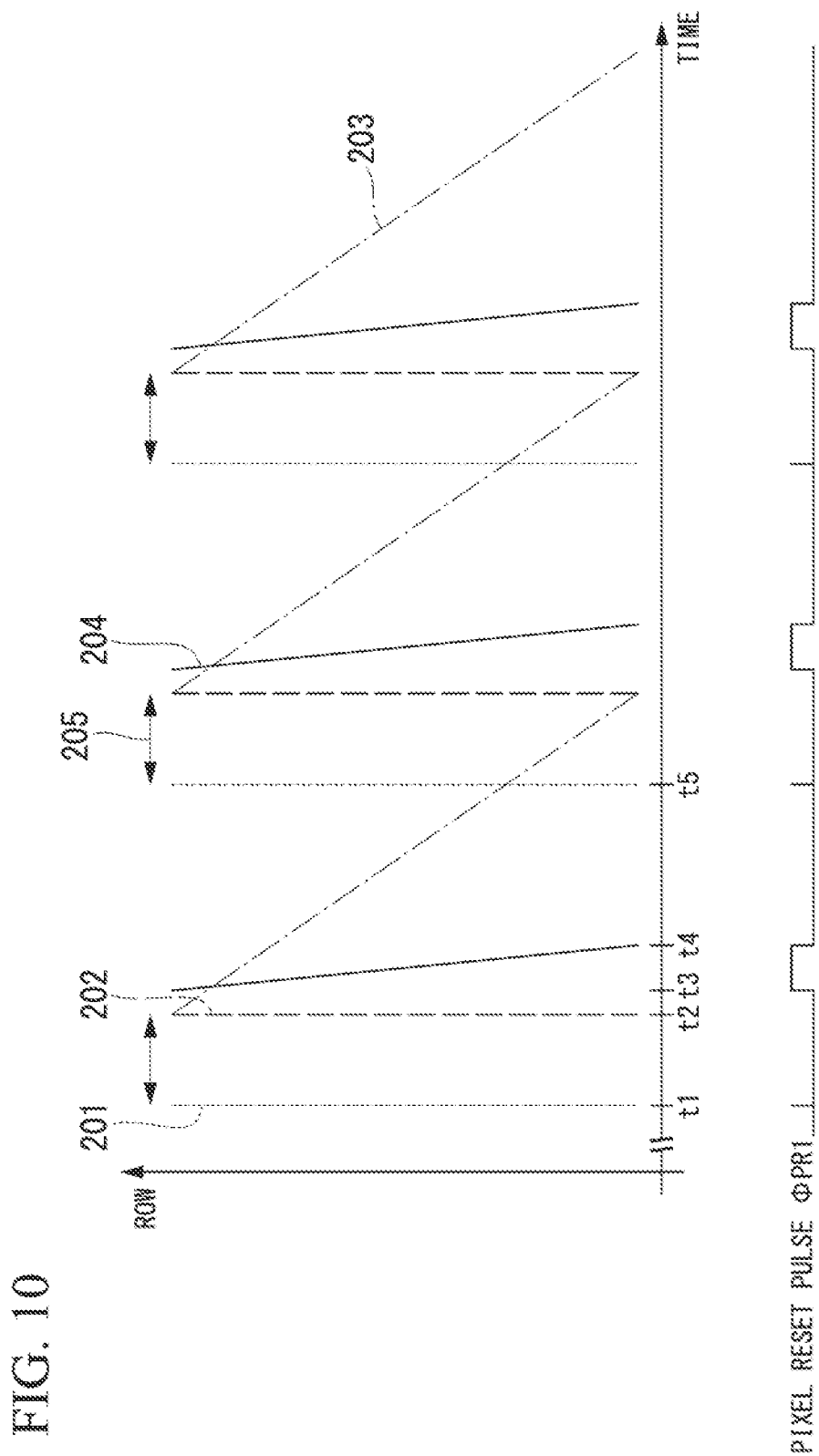
FIG. 10 is a sequence diagram that shows an outline of the second operation sequence when performing the operations of reading out of the AF unit pixel and global exposure in the solid-state image pickup device in accordance with the second preferred embodiment of the present invention.

Next, the second operation sequence of global exposure in the solid-state image pickup device 2 of the second embodiment shall be described. FIG. 10 is a sequence diagram that shows an outline of the second operation sequence when performing the operations of reading out of the AF unit pixel 14 and global exposure in the solid-state image pickup device 2 in accordance with the second preferred embodiment of the present invention. Also shown in the second operation sequence diagram of global exposure shown in FIG. 10 is the pixel reset pulse φPR1 that resets the image pickup unit pixel 213, in the same manner as the first operation sequence diagram of global exposure shown in FIG. 9.

In FIG. 10, the horizontal axis denotes time, while the vertical axis denotes the rows of the solid-state image pickup device 2, in the same manner as the first operation sequence diagram of the global exposure shown in FIG. 9. A sequence 201 shows the image pickup pixel reset operation, a sequence 202 shows the image pickup pixel transfer operation, and a sequence 203 shows the image signal readout operation, a sequence 204 shows the AF signal readout operation, and a storage time 205 shows the exposure period of one time from the image pickup pixel reset operation to the image pickup pixel transfer operation.

The second operation sequence of global exposure shown in FIG. 10 is the same as the first operation sequence of global exposure shown in FIG. 9, other than the timing of the pixel reset pulse φPR1 that the image pickup pixel vertical scanning circuit 211 inputs to the pixel reset transistor PM2. Accordingly, in the description of the second operation sequence of global exposure shown in FIG. 10, only the operations differing from the first operation sequence of global exposure shown in FIG. 9 shall be described.

In the second operation sequence of global exposure in the solid-state image pickup device 2, first at time t1, the signal charges that have been stored in the photodiode PD and the pixel charge storage portion FD in all of the image pickup unit pixels 213 that are provided in the pixel array portion 210 are reset by the image pickup pixel reset operation of sequence 201 in the same manner as the first operation sequence. Also, the signal charges that have been stored in the image pickup unit memory cell coupling capacitance CC and the memory charge storage portion MC in all of the image pickup unit memory cells 223 that are provided in the memory array portion 220 are simultaneously reset.

Next, at time t2 at which the storage time 205 that was set in advance has elapsed, the signal charges produced by the photodiode PD in all of the image pickup unit pixels 213 provided in the pixel array portion 210 are transferred simultaneously to the pixel charge storage portion FD in each image pickup unit pixel 213 and AF unit pixel 14 by the image pickup pixel transfer operation of the sequence 202 that is the similar way as the first operation sequence. Moreover, the image pickup pixel signals respectively output by the image pickup unit pixels 213 are simultaneously transmitted (transferred) to the corresponding image pickup unit memory cells 223, and held in the memory charge storage portion MC in each image pickup unit memory cell 223.

After that, the image pickup memory signals are outputted in turn to the pixel signal processing chip horizontal scanning circuit 225 at each row of the image pickup unit memory units 223 provided in the memory array 220, by the image signal readout operation of the sequence 203, in the same manner as the first operation sequence. Thereby, the pixel signal processing chip horizontal scanning circuit 225 in turn outputs the image pickup memory signals that have been respectively input row by row from the image pickup unit memory units 223 in each column to the outside column by column as image signals that the solid-state image pickup device 2 outputs.

Also, from time t3 after the image pickup pixel transfer operation of sequence 202 is completed, the AF image signals are in turn output to the pixel chip horizontal scanning circuit 215 at each row where the AF unit pixels 14 are arranged in the pixel array portion 210, by the AF signal readout operation of the sequence 204, in the same manner as the first operation sequence. Thereby, the pixel chip horizontal scanning circuit 215 in turn outputs the AF pixel signals that have input row by row from the AF unit pixels 14 in each column to the outside column by column as the AF signals that the solid-state pickup device 2 outputs.

Note that in the second operation sequence of global exposure in the solid-state image pickup device 2, during the AF signal readout operation of the sequence 204, the photodiode PD and the pixel charge storage portion FD in all the image pickup unit pixels 213 provided in the pixel array portion 210 are put in a reset state.

More specifically, the image pickup pixel vertical scanning circuit 211, by setting the pixel reset pulse φPR1 and the pixel transfer pulse φPT1 of all the rows in the pixel array portion 210 to, for example, the "High" level, puts the pixel reset transistor PM2 and the pixel transfer transistor PM1 in all of the image pickup unit pixels 213 of the pixel array portion 210 into the ON state, and thereby resets the photodiode PD and the pixel charge storage portion FD in all the image pickup unit pixels 213.

After that, at time t4 or later at which the AF signal readout operation of the sequence 204 is completed, the second operation sequence of global exposure for obtaining the next image is started in the same manner as the first operation sequence.

In this way, in the second operation sequence in the solid-state image pickup device 2 of the second embodiment, it is possible to efficiently acquire a signal for phase-detection AF while performing an exposure operation of the global exposure system by driving the AF unit pixels 14 at a timing that does not influence the global exposure operation of the solid-state image pickup device 2, in the same manner as the first operation sequence of global exposure in the solid-state image pickup device 2.

Also, in the second sequence, while reading out the AF pixel signals from the AF unit pixels 14, the photodiode PD and the pixel charge storage portion FD in all the image pickup unit pixels 213 are put in a reset state, that is to say, the image pickup unit pixels 213 are put in a state of not performing image pickup of the subject. Thereby, in the second operation sequence in the solid-state image pickup device 2 of the second embodiment, in addition to reducing the effect of circuit noise on the image quality, it is possible to reduce the effect of charge noise such as blooming on image quality, and obtain an image of still better image quality by the exposure operation of the global exposure system, in the same manner as the operation sequence of global exposure in the solid-state image pickup device 1 of the first embodiment and the first operation sequence of the global exposure in the solid-state image pickup device 2.

Note that even in the first operation sequence and the second operation sequence, the case was described of performing the AF signal readout operation from the AF unit pixels 14 (sequence 204) once in the time from the image pickup pixel transfer operation of the image pickup unit pixels 213 and the image pickup unit memory cells 223 (sequence 202) to the next image pickup pixel reset operation (sequence 201). However, the number of times of the AF signal readout operation from the AF unit pixels 14 is not limited to the number of times of the first operation sequence shown in FIG. 9 and the number of times of the second operation sequence shown in FIG. 10, and it is possible to perform control based on the same concept as the operation sequence of global exposure in the solid-state image pickup unit 1 in the first embodiment shown in FIG. 4. For example, during the image signal readout operation of the image pickup unit memory cells 223 (sequence 203), in the case of there being time to be able to perform the AF signal acquisition operation by the AF unit pixels 14, that is to say, the image pickup pixel reset operation, the image pickup pixel transfer operation, and the AF signal readout operation of the AF unit pixels 14 (sequence 204), the AF pixel vertical scanning circuit 12 can also perform control that drives the AF unit pixels 14 so as to perform the next AF signal acquisition operation.

Note that in the constitution of the solid-state image pickup device 2 of the second embodiment shown in FIG. 6, the description was given for the constitution in which nothing is arranged at the positions of the memory array portion 220 corresponding to the positions where the AF unit pixels 14 are arranged in the pixel array portion 210. However, for example, it is possible to adopt a constitution in which constituent elements are arranged that perform temporary storage (retention) of AF pixel signals that are transmitted (transferred) from the corresponding AF unit pixels 14, in the manner of the image pickup unit memory cells 223 that correspond to the image pickup unit pixels 213. By adopting this constitution, for example, even in the state of the output of the AF pixel signals to the pixel signal processing chip horizontal scanning circuit 225 not being complete, the AF pixel vertical scanning circuit 12 can also perform control that drives the AF unit pixels 14 so as to perform the next AF signal acquisition operation.

Note that in the constitution of the solid-state image pickup device 2 of the second embodiment shown in FIG. 6, the image pickup unit pixels 213 cannot be arranged at the positions where the AF unit pixels 14 of the pixel array portion 210 are arranged, and so the solid-state image pickup device 2 cannot acquire image signals at those positions. For this reason, if the pixel array portion 210 is considered to be an ordinary pixel array for acquiring an image, it will be the same state as a pixel deficiency occurring at the positions where the AF unit pixels 14 are arranged. Thereby, in the image pickup device that mounts the solid-state image pickup device 2, since the image signals of the positions where the AF unit pixels 14 are arranged are treated as defective pixels, a process is required to compensate for the pixels at the positions where the AF unit pixels 14 are arranged. In auto focus control in an image pickup device, AF unit pixels 14 of a certain number must be arranged in the pixel array portion 210. When the number of AF unit pixels 14 arranged in the pixel array portion 210 is increased, many defective pixels come to exist in the ordinary pixel array for acquiring an image. As a result, even if compensation processing for the defective pixels is performed, it is feared that it may be difficult for the image pickup device to obtain an image of good image quality. Therefore, a solid-state image pickup device is conceivable having a constitution in which a constituent element that can acquire an image signal is arranged at a position in the memory array portion 220 corresponding to the position where the AF unit pixel 14 is disposed in the pixel array portion 210, at which nothing is disposed in the constitution of the solid-state image pickup device 2 of the second embodiment shown in FIG. 6.

Third Preferred Embodiment

Next, the solid-state image pickup device of a third preferred embodiment shall be described. The solid-state image pickup device 3 of the third preferred embodiment is a MOS-type solid-state image pickup device in which image-pickup unit pixels for imaging a subject are arrayed in a two-dimensional matrix, and that is constituted by two chips that output electrical signals corresponding to the received light quantity (light beam quantity) of the incident subject light, in the same manner as the solid-state image pickup device 2 of the second preferred embodiment. Also, in the solid-state image pickup device 3 of the third preferred embodiment, besides the image pickup unit pixels, AF unit pixels are arranged at an arbitrary interval in the same manner as the solid-state image pickup device 2 of the second preferred embodiment.

Figure 11:
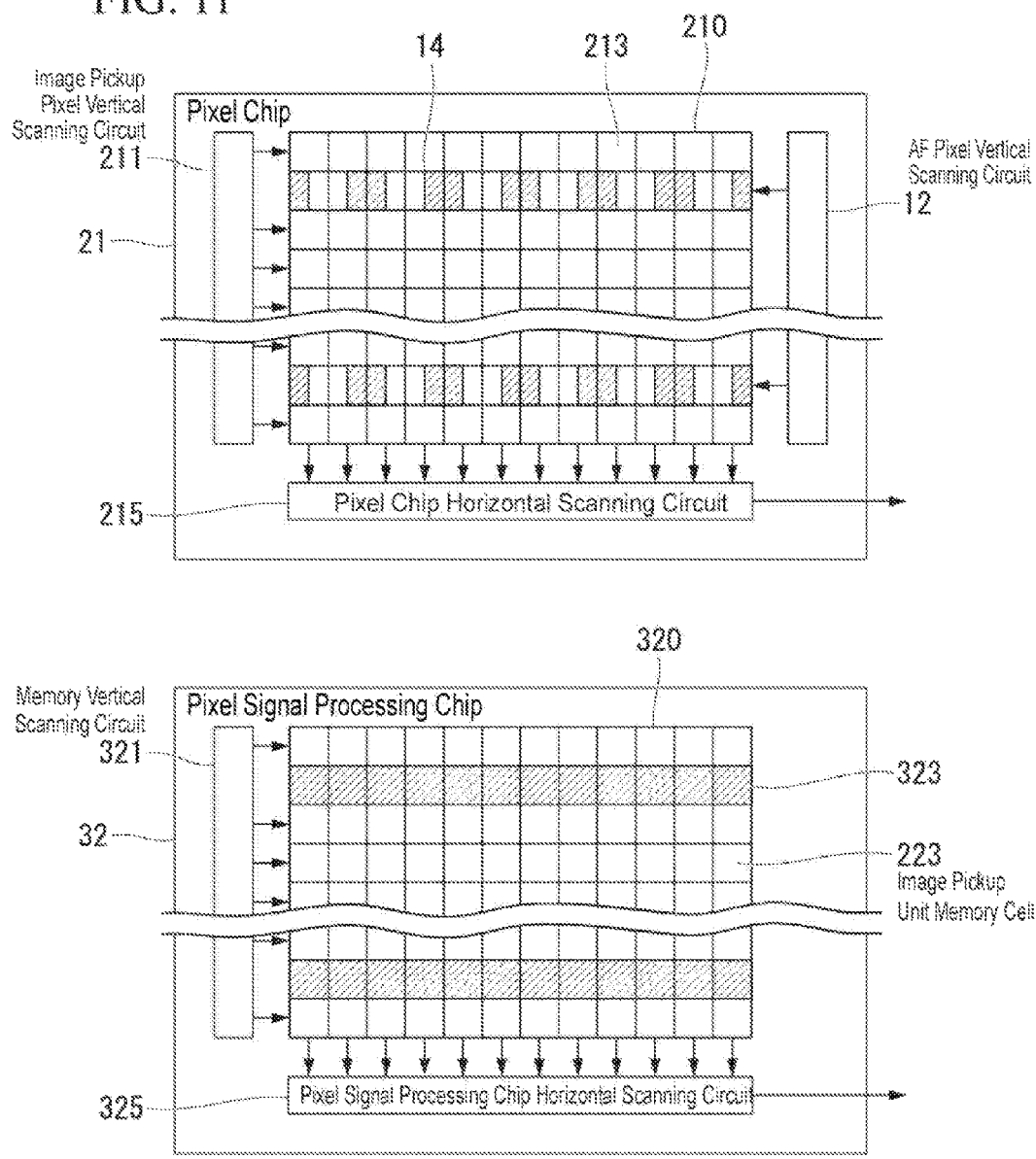
FIG. 11 is a block diagram that shows the outline configuration of the solid-state image pickup device in accordance with a third preferred embodiment of the present invention.

FIG. 11 is a block diagram that shows the outline configuration of the solid-state image pickup device in accordance with the third preferred embodiment of the present invention. In FIG. 11, the solid-state image pickup device 3 is constituted from a pixel array portion 210 that is constituted by a plurality of image pickup unit pixels 213 and AF unit pixels 14, a pixel chip 21 that is constituted from an image pickup pixel vertical scanning circuit 211, an AF pixel vertical scanning circuit 12, and a pixel chip horizontal scanning circuit 215, and a pixel signal processing chip 32 that is constituted from a memory array portion 320 that is constituted by a plurality of image pickup unit memory cells 223 and corrective unit pixels 323, a memory vertical scanning circuit 321, and a pixel signal processing chip horizontal scanning circuit 325. In the solid-state image pickup device 3 in accordance with the third preferred embodiment, an ordinary pixel for imaging a subject is constituted by the image pickup unit pixel 213 and the image pickup unit memory cell 223, and moreover, the corrective unit pixel 323 also is constituted as an ordinary pixel. Note that in the description given below, the region of the pixel array portion 210 is described as being the effective pixel region in the solid-state image pickup device 3 (effective pixel area).

Note that in the case of the solid-state image pickup device 3 of the third preferred embodiment, similarly to the solid-state image pickup device 2 of the second preferred embodiment, a single solid-state image pickup device 3 is constituted with two chips (the pixel chip 21 and the pixel signal processing chip 32), with some constituent elements being the same as the solid-state image pickup device 2 of the second preferred embodiment. More specifically, only the constituent elements provided in the pixel signal processing chip 32 differ from the constituent elements provided in the pixel signal processing chip 22 of the solid-state image pickup device 2 of the second preferred embodiment. Accordingly, among the constituent elements of the solid-state image pickup device 3 of the third preferred embodiment, only those constituent elements that differ with the solid-state image pickup device 2 of the second preferred embodiment shall be described, and the same reference numerals shall be given to the constituent elements that are the same as the solid-state image pickup device 2 of the second preferred embodiment, with descriptions thereof being omitted.

Each of the corrective unit pixels 323 in the memory array portion 320 converts to an electrical signal the incident subject light that passes through the respective AF unit pixel 14 that is arranged in the pixel array portion 210 of the pixel chip 21, and in accordance with a control signal that is input from the memory vertical scanning circuit 321, outputs an electrical signal corresponding to the received light quantity (light beam quantity) of the incident subject light as a corrective pixel signal to the pixel signal processing chip horizontal scanning circuit 325. In the memory array portion 320, the respective corrective unit pixels 323 are arranged at positions corresponding to the positions of the AF unit pixels 14 that are arranged in the pixel array portion 210. Note that a detailed description relating to the respective corrective unit pixels 323 shall be given below.

The memory vertical scanning circuit 321, similarly to the memory vertical scanning circuit 221 provided in the solid-state image pickup device 2 of the second preferred embodiment, controls each image pickup unit memory cell 223 in the memory array 320, to cause the image pickup pixel signal held in each image pickup unit memory cells 223 (image pickup memory signal) to be output to the pixel signal processing chip horizontal scanning circuit 325. Moreover, the memory vertical scanning circuit 321 controls each corrective unit pixel 323 in the memory array 320, to cause the corrective pixel signal from each corrective unit pixel 323 to be output to the pixel signal processing chip horizontal scanning circuit 325. The memory vertical scanning circuit 321 outputs to the image pickup unit memory cells 223 and the corrective unit pixels 323 that are provided in the memory array 320 a control signal for performing control so that the image pickup unit memory cells 223 and the corrective unit pixels 323 perform a global exposure operation.

The pixel signal processing chip horizontal scanning circuit 325 in turn outputs to outside of the solid-state image pickup device 3 the image pickup memory signals that were respectively input from the image pickup unit memory cells 223 in each column of the memory array portion 320, and the corrective unit pixel signals respectively input from the corrective unit pixels 323 as the image signals that the solid-state image pickup device 3 has imaged of the subject. That is to say, in the output of the image signals by the pixel signal processing chip horizontal scanning circuit 325, the corrective pixel signals input from the corrective unit pixels 323 are output as image signals during the timing to output the image signals of the positions where the AF unit pixels 14 are arranged, and the image pickup memory signals input from the image pickup unit memory cells 223 are output as image signals during another timing.

Figure 12:
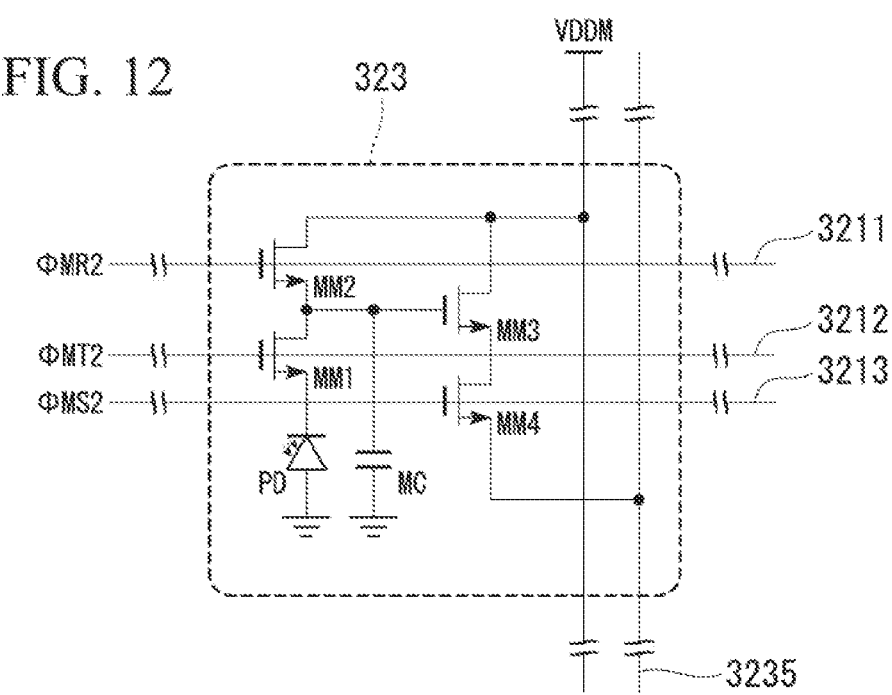
FIG. 12 is a circuit diagram that shows the schematic configuration of the corrective unit pixel in the pixel signal processing chip that is provided in the solid-state image pickup device in accordance with the third preferred embodiment of the present invention.

Next, the corrective unit pixels 323 provided in the memory array 320 in the solid-state image pickup device 3 of the third preferred embodiment shall be described. FIG. 12 is a circuit diagram that shows the schematic configuration of the corrective unit pixel 323 in the pixel signal processing chip 32 that is provided in the solid-state image pickup device 3 in accordance with the third preferred embodiment of the present invention.

The corrective unit pixel 323 is a circuit that outputs a corrective pixel signal, which consists of incident subject light that has passed through the AF unit pixel 14 converted to an electrical signal, to a corrective pixel vertical signal line 3235. Each corrective unit pixel 323 is constituted from a photodiode PD, a memory charge storage portion MC, a memory transfer transistor MM1, a memory reset transistor MM2, a memory amplification transistor MM3, and a memory selection transistor MM4. Note that the corrective unit pixel 323 is a constitution that holds the signal charge that the photodiode PD provided in the corrective unit pixel 323 has produced, instead of the image pickup unit memory cell 223 that is arranged in the memory array portion 320 of the pixel signal processing chip 32 holding the image pickup pixel signal that was input via the chip connection portion 23. That is to say, as is clear by referring to FIG. 12, it has the same constitution as the image pickup unit pixel 13 that is provided in the solid-state image pickup device 1 of the first preferred embodiment, and the image pickup unit pixel 213 that is provided in the solid-state image pickup device 2 of the first preferred embodiment. Accordingly, with regard to the constituent elements of the corrective unit pixel 323, the same reference numerals are given to the constituent elements that are similar to the image pickup unit pixel 13 shown in FIG. 2, the image pickup unit pixel 213 shown in FIG. 7, and the image pickup unit memory cell 223 shown in FIG. 8, and so only differing operations shall be described.

The photodiode PD generates a signal charge by performing photoelectric conversion of incident light that has passed through the AF unit pixel 14.

The memory charge storage portion MC is a capacitance that stores the signal charge that the photodiode PD has produced.

The memory transfer transistor MM1 transfers the signal charge that the photodiode PD has produced to the memory charge storage portion MC that is connected to the gate terminal of the memory amplification transistor MM3, based on a corrective pixel transfer pulse φMT2 that is input from the memory vertical scanning circuit 321 via a corrective pixel transfer line 3212. The signal charge that is transferred by the memory transfer transistor MM1 is stored in the memory charge storage portion MC.

The memory amplification transistor MM3 outputs a voltage corresponding to the signal charge that was stored in the memory charge storage portion MC.

The memory reset transistor MM2 resets the memory charge storage portion MC to the power supply potential VDDM, based on a corrective pixel reset pulse φMR2 that is input from the memory vertical scanning circuit 321 via a corrective pixel reset line 3211.

The memory selection transistor MM4 outputs the voltage that the memory amplification transistor MM3 has output to a corrective pixel vertical signal line 3235 as the corrective pixel signal that the corrective unit pixel 323 has output, based on a corrective pixel selection pulse φMS2 that is input from the memory vertical scanning circuit 321 via a corrective pixel selection line 3213.

The corrective pixel signal that was output to the corrective pixel vertical signal line 3235 is input to the pixel signal processing chip horizontal scanning circuit 325.

With this kind of constitution, in the solid-state image pickup device 3 of the third preferred embodiment, the subject light that has passed through the AF unit pixel 14 is received by the photodiode PD in the corrective unit pixel 323, and the pixel signal processing chip horizontal scanning circuit 325 outputs the corrective pixel signal that corresponds to the received light quantity (light beam quantity) to outside of the solid-state image pickup device 3 as the image signal corresponding to the position at which the AF unit pixel 14 is arranged in the pixel array 210.

Note that when the memory vertical scanning circuit 321 controls each of the image pickup unit memory cells 223 in the memory array portion 320, it simultaneously controls the corrective unit pixels 323, therefore the operation sequence of global exposure in the solid-state image pickup device 3 of the third preferred embodiment can be considered in the same way as the operation sequence of global exposure in the solid-state image pickup device 1 of the first preferred embodiment and the solid-state image pickup device 2 of the second preferred embodiment. More specifically, the memory vertical scanning circuit 321 controls the corrective pixel transfer pulse φMT2, the corrective pixel reset pulse φMR2, and the corrective pixel selection pulse φMS2 in the same way as when the memory transfer pulse φMT1, the memory reset pulse φMR1, and the memory selection pulse φMS1 are set to the "High" level or the "Low" level. Accordingly, detailed descriptions relating to the operation sequence of global exposure in the solid-state image pickup device 3 of the third preferred embodiment shall be omitted.

In this way, even in the solid-state image pickup device 3 of the third preferred embodiment, it is possible to efficiently acquire a signal for phase-detection AF while performing an exposure operation of the global exposure system, in the same manner as the solid-state image pickup device 1 of the first preferred embodiment and the solid-state image pickup device 2 of the second preferred embodiment.

Also, in the solid-state image pickup device 3 of the third preferred embodiment, the corrective unit pixel 323, by receiving the subject light that has passed through the AF unit pixel 14, outputs a corrective pixel signal at the position where the AF unit pixel 14 is arranged. Then, the pixel signal processing chip horizontal scanning circuit 325 outputs the corrective pixels signal to outside of the solid-state image pickup device 3 as an image signal that the solid-state image pickup device 3 has imaged of the subject, during the timing of output the image signals of the locations where the AF unit pixels 14 are arranged. Thereby, in the solid-state image pickup device 3 of the third preferred embodiment, it is possible to prevent the occurrence of pixel dropping at the locations where the AF unit pixels 14 are arranged, and so in the image pickup device in which the solid-state image pickup device 3 is mounted, it is possible to obtain an image with an even better image quality.

As stated above, the solid-state image pickup device of the third preferred embodiment is provided with a vertical scanning circuit that controls ordinary pixels for imaging a subject, and a vertical scanning circuit that controls pixels for phase-detection AF that are used for autofocus control. Thereby, when imaging a subject by the solid-state image pickup device of the third preferred embodiment, by separating the ordinary pixels and the phase-detection AF pixels, it is possible to control the driving of the respective pixels. By doing so, in an imaging device that is mounted with the solid-state image pickup device of the third preferred embodiment, it is possible to perform high-speed autofocus control identical to the autofocus control of a system that uses phase-detection AF sensors based on the AF signals output by the solid-state image pickup device, and it is possible to acquire an image having good image quality by an exposure operation of the global exposure system.

Note that in the solid-state image pickup device of the third preferred embodiment, the description was given for the case of the AF unit pixel being arranged completely in specified rows in the pixel array, that is to say, AF unit pixels of one-row portions. However, it is preferable that the locations of the AF unit pixels arranged in the pixel array of the solid-state image pickup device be arranged at required locations when performing autofocus control for phase-detection AF in the image pickup device that is mounted with the solid-state image pickup device.

(Image Pickup Device)

Figure 13:
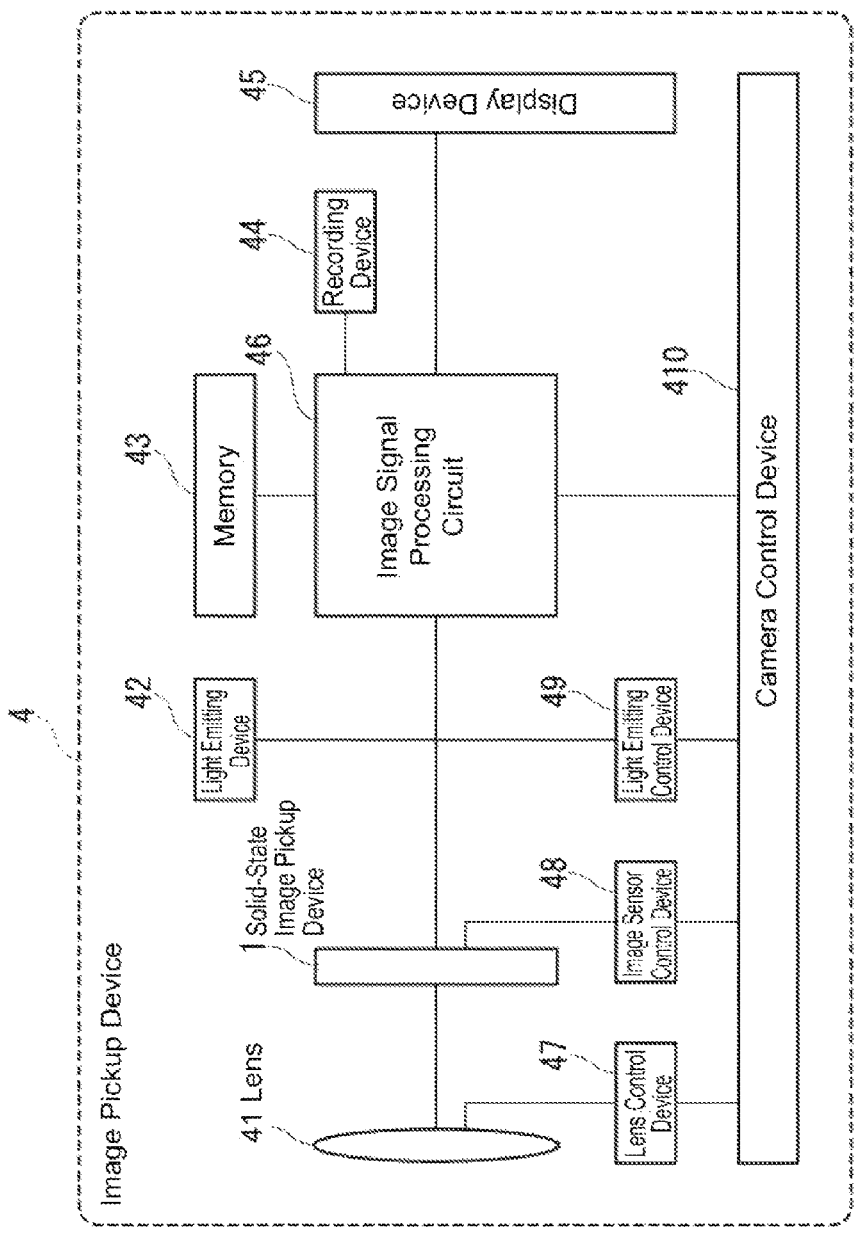
FIG. 13 is a block diagram that shows the schematic configuration of an image pickup device that is provided with the solid-state image pickup device in accordance with a preferred embodiment of the present invention.

Next, an image pickup device shall be described in which is mounted any of the solid-state image pickup devices in accordance with the first to the third preferred embodiments. FIG. 13 is a block diagram that shows the schematic configuration of an image pickup device (for example, a mirrorless digital camera) that is provided with the solid-state image pickup device in accordance with the third preferred embodiment of the present invention. FIG. 13 shows one example of the image pickup device in which is mounted the solid-state image pickup device of the third preferred embodiment. In terms of hardware, each constituent element shown here can be realized by elements including a CPU or memory of a computer. In terms of software, it can be realized by computer programs and the like, but drawn and described herein are functional blocks that are realized in cooperation with such components. Thus, it should be understood by those skilled in the art that these functional blocks can be realized in a variety of forms by hardware only, software only or the combination thereof.

The image pickup device 4 shown in FIG. 13 consists of a lens unit 41, the solid-state image pickup device 3, a light emitting device 42, a memory 43, a recording device 44, a display device 45, an image signal processing circuit 46, a lens control device 47, an image sensor control device 48, a light emitting control device 49, and a camera control device 410.

Zooming, focusing and aperture of the lens unit 41 are drive-controlled by the lens control device 47, and the subject image is formed on the solid-state image pickup device 3.

The solid-state image pickup device 3 is the solid-state image pickup device 3 of the third preferred embodiment. The solid-state image pickup device 3 is a MOS-type solid-state image pickup device that is driven and controlled by the image sensor control device 48, and that outputs an image signal in accordance with the received light quantity of the subject light that is incident on the solid-state image pickup device 3 via the lens unit 41. Also, the solid-state image pickup device 3 outputs an AF signal in accordance with the received light quantity of the incident subject light.

The light emitting device 42 is a device such as a strobe or flash that is driven and controlled by the light emitting control device 49, and that adjusts the light that reflects from the subject by throwing the light emitted from the light emitting device 42 onto the subject.

The image signal processing circuit 46, with respect to the image signal that is output from the solid-state image pickup device 3, performs processing such as amplification of the signal, conversion to image data and various corrections, and compression of the image data. Also, the image signal processing circuit 46 performs processing for performing the same autofocus control as the autofocus control of a system that uses phase-detection AF sensors, based on the AF signals output from the solid-state image pickup device 3. Note that the image signal processing circuit 46 utilizes the memory 43 as a temporary storage means of the image data and processing data in each process.

The recording device 44 is a removable storage medium such as a semiconductor memory, and performs recording and reading of image data and processed data.

The display device 45 is a display device such as a liquid crystal display that displays images based on image data that is imaged on the solid-state image processing device 3 and processed by the image signal processing circuit 46, or image data that is read out from the recording device 44.

The camera control device 410 is a control device that performs control of the entire image pickup device 4. Also, the camera control device 410 controls the driving of the solid-state image pickup device by the image sensor control device 48 so as to cause the solid-state image pickup device 3 to execute the exposure operation of the global exposure system. Also, the camera control device 410 controls the focus driving by the lens unit portion 41 by controlling the lens control device 47 based on the processing result of the autofocus control of a system that uses phase-detection AF sensors by the image signal processing circuit 46. Also, the camera control device 410 performs cooperative control with the solid-state image pickup device 3 and the light emitting device 42 by controlling the image sensor control device 48 and the light emitting control device 49.

As stated above, the image pickup device 4 of the third preferred embodiment is equipped with any of the solid-state image pickup devices of the first preferred embodiment to the third preferred embodiment. The camera control device 410 that is provided in the image pickup device 4 of the third preferred embodiment controls the driving of the solid-state image pickup device so as to acquire a phase-detection AF signal, while performing an exposure operation of a global exposure system. Thereby, the image signal processing circuit 46 that is provided in the image pickup device 4 of the third preferred embodiment can generate an image of good image quality while with performing the same autofocus control as the autofocus control of a system that uses phase-detection AF sensors.

As stated above, according to the preferred embodiment for carrying out the present invention, in addition to a vertical scanning circuit that controls ordinary pixels for imaging a subject, a vertical scanning circuit that controls the pixels for phase-detection AF that are used for autofocus control are provided in the solid-state image pickup device. In addition, the ordinary pixels and the phase-detection AF pixels are separated to control the driving of the respective pixels. Thereby, in a solid-state image pickup device according to an aspect for carrying out the present invention, it is possible to drive the ordinary pixels by an exposure operation of a global exposure system, and it is possible to drive the phase-detection AF pixels by an exposure operation of a line exposure system, while operating the ordinary pixels with a global exposure system.

Thereby, in an exposure device that is equipped with the solid-state image pickup device in accordance with a preferred embodiment for carrying out the present invention, it is possible to acquire an image with good image quality in which the subject is not distorted even when imaging a moving subject, and it is possible to perform high-speed autofocus control similar to autofocus control of a system that uses phase-detection AF sensors, based on the signals for phase-detection AF that the solid-state image pickup device has output.

Note that the specific constitutions of the circuit configurations and drive methods in the present invention are not limited to the forms for carrying out the present invention, and various modifications can be made within a scope that does not deviate from the gist of the present invention. For example, even in the case of changing the control method of the solid-state image pickup device or drive method of the pixels due to the constituent elements or drive methods of the image pickup unit pixel, image pickup unit memory cell, corrective unit pixel, and AF unit pixel having changed, it is possible to apply the concept of the present invention as a method of achieving both imaging by a global exposure operation and acquisition of a phase-detection AF signal.

In addition, the arrangement in the row direction and column direction of the image pickup unit pixel, the image pickup unit memory cell, the corrective unit pixel, or the AF unit pixel is not limited to the aspect for carrying out the present invention, and it is possible to change the number in the row direction and column direction for arranging the image pickup unit pixel, the image pickup unit memory cell, the corrective unit pixel, or the AF unit pixel within a scope that does not deviate from the gist of the present invention.

Also, the solid-state image pickup device in accordance with the preferred embodiments of the present invention may consist of two substrates connected by a connection portion, or may consist of three or more substrates connected by a connection portion. In the case of a solid-state image pickup device in which three or more substrates are connected by a connection portion, two among them correspond to the first substrate and the second substrate of the claims.

According to a preferred embodiment of the present invention, it is possible to realize a solid-state image pickup device, a control method for a solid-state image pickup device, and an image pickup device that efficiently reads out phase-detection AF signals and ordinary pixel signals for image pickup and acquire images with good image quality and can achieve both high-speed autofocus control and acquisition of images with good image quality, even in the case of performing an exposure operation for a global exposure system in a solid-state image pickup device in which phase-detection AF pixels and ordinary pixels are arranged in the effective pixel area.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A solid-state image pickup device, comprising a plurality of pixels arranged in a two-dimensional matrix, and outputting signals corresponding to the light quantity incident on each of the plurality of pixels, wherein
   each of the plurality of pixels comprises:
   a first pixel that is equipped with a first photoelectric conversion means that converts incident light into an electrical signal to store the electrical signal; and
   a second pixel that is equipped with a second photoelectric conversion means that converts incident light into an electrical signal to store the electrical signal, and a light beam selecting means that selects a light beam that is incident on the second photoelectric conversion means,
   the solid-state image pickup device comprises:
   a first scanning circuit that performs control of a first exposure operation on the first pixels that simultaneously drives the first photoelectric conversion means of all the first pixels and, after a preset storage time has elapsed, in turn outputs the electrical signals that have been stored in the respective first photoelectric conversion means for each row in which the first pixels are arranged; and
   a second scanning circuit that performs control of a second exposure operation on the second pixels that, for each row in which the second pixels are arranged, in turn drives the second photoelectric conversion means of the respective second pixels and in turn outputs the electrical signals that have been stored in the respective second photoelectric conversion means,
   the solid-state image pickup device outputs the electrical signals, which have been stored in the first photoelectric conversion means, as image signals, and the solid-state image pickup device outputs the electrical signals, which have been stored in the second photoelectric conversion means, as focus signals.

2. The solid-state image pickup device according to claim 1, wherein
the second scanning circuit performs control of the second exposure operation during the period in which the first scanning circuit in turn outputs the electrical signals that have been stored in the respective first photoelectric conversion means for each row in which the first pixels are arranged.

3. The solid-state image pickup device according to claim 2, wherein
the second scanning circuit performs control of the second exposure operation during the period other than the period in which the first scanning circuit simultaneously drives the first photoelectric conversion means of all the first pixels and the period of the storage time.

4. The solid-state image pickup device according to claim 1, wherein
the circuit elements that constitute the pixels are formed separated into a first substrate and a second substrate that are electrically connected by a connection portion,
the first photoelectric conversion means of the first pixel is formed in the first substrate,
the first pixel is further provided with a charge storage portion that is formed in the second substrate and that holds the electrical signal that was stored in the first photoelectric conversion means,
the second photoelectric conversion means and the light beam selecting means of the second pixel are formed in the first substrate,
the first scanning circuit, after the storage time has elapsed, simultaneously transfers the electrical signals that have been stored in the first photoelectric storage means of all the first pixels to the corresponding charge storage portions, and afterward outputs in turn the electrical signals that have been held in the respective charge storage portions for each row in which the first pixels are arranged, and
the first scanning circuit outputs the electrical charges held in the charge storage portions as image signals.

5. The solid-state image pickup device according to claim 4, wherein
the first pixel further comprises a reset means that resets the electrical signal that has been stored in the first photoelectric conversion means, and
the first scanning circuit enables the reset by the reset means while the second scanning circuit is performing control of the second exposure operation.

6. The solid-state image pickup device according to claim 4, wherein
the second pixel further comprises a third photoelectric conversion means that is formed in the second substrate and that converts the incident light that has passed through the first substrate into an electrical signal to stores the electrical signal,
the first scanning circuit simultaneously drives the first photoelectric conversion means of all the first pixels and the third photoelectric conversion means of all the second pixels, and after the storage time has elapsed, simultaneously transfers the electrical signals that have been stored in the first photoelectric conversion means of all the first pixels to the corresponding charge storage portions, and then outputs in turn the electrical signals that are held in the respective charge storage portions and the electrical signals that are stored in the third photoelectric conversion means for each row in which the first pixels and the second pixels are arranged, and
the first scanning circuit outputs the electrical signals that are held in the charge storage portions and the electrical signals that are stored in the third photoelectric conversion means as image signals.

7. A control method for a solid-state image pickup device that has a plurality of pixels arranged in a two-dimensional matrix, and that outputs signals corresponding to the light quantity incident on each of the plurality of pixels, wherein
each of the plurality of pixels comprises:
a first pixel that is equipped with a first photoelectric conversion means that converts incident light into an electrical signal and stores it; and
a second pixel that is equipped with a second photoelectric conversion means that converts incident light into an electrical signal and stores it, and a light beam selecting means that selects the light beam that is incident on the second photoelectric conversion means,
the control method comprises:
a first scanning step that performs control of a first exposure operation on the first pixels by a first scanning circuit that simultaneously drives the first photoelectric conversion means of all the first pixels and, after a preset storage time has elapsed, in turn outputs the electrical signals that have been stored in the respective first photoelectric conversion means for each row in which the first pixels are arranged; and
a second scanning step that performs control of a second exposure operation on the second pixels by a second scanning circuit that, for each row in which the second pixels are arranged, in turn drives the second photoelectric conversion means of the respective second pixels, and in turn outputs the electrical signals that have been stored in the respective second photoelectric conversion means,
the solid-state image pickup device outputs the electrical signals, which have been stored in the first photoelectric conversion means, as image signals, and
the solid-state image pickup device outputs the electrical signals, which have been stored in the second photoelectric conversion means, as focus signals.

8. An image-pickup device comprising a solid-state image pickup device that has a plurality of pixels arranged in a two-dimensional matrix, and that outputs signals corresponding to the light quantity incident on each of the plurality of pixels, wherein
each of the plurality of pixels comprises:
a first pixel that is equipped with a first photoelectric conversion means that converts incident light into an electrical signal to store the electrical signal; and
a second pixel that is equipped with a second photoelectric conversion means that converts incident light into an electrical signal to store the electrical signal, and a light beam selecting means that selects the light beam that is incident on the second photoelectric conversion means,
wherein the solid-state image pickup device comprises:
a first scanning circuit that performs control of a first exposure operation on the first pixels that simultaneously drives the first photoelectric conversion means of all the first pixels and, after a preset storage time has elapsed, in turn outputs the electrical signals that have been stored in the respective first photoelectric conversion means for each row in which the first pixels are arranged; and
a second scanning circuit that performs control of a second exposure operation on the second pixels that, for each row in which the second pixels are arranged, in turn drives the second photoelectric conversion means of the respective second pixels and in turn outputs the electrical signals that have been stored in the respective second photoelectric conversion means, the solid-state image pickup device outputs the electrical signals that have been stored in the first photoelectric conversion means as image signals, and the solid-state image pickup device outputs the electrical signals that have been stored in the second photoelectric conversion means as focus signals.

\* \* \* \* \*